United States Patent
Fei et al.

(10) Patent No.: US 12,439,404 B2
(45) Date of Patent: Oct. 7, 2025

(54) UPLINK SIGNAL SENDING METHOD, APPARATUS, AND SYSTEM

(71) Applicant: HUAWEI TECHNOLOGIES CO., LTD., GuangDong (CN)

(72) Inventors: Yongqiang Fei, Shenzhen (CN); Yi Long, Beijing (CN); Hailong Hou, Beijing (CN); Juan Zheng, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 18/068,844

(22) Filed: Dec. 20, 2022

(65) Prior Publication Data
US 2023/0121762 A1    Apr. 20, 2023

Related U.S. Application Data

(63) Continuation of application No. PCT/CN2021/100683, filed on Jun. 17, 2021.

(30) Foreign Application Priority Data

Jun. 22, 2020 (CN) .......................... 202010575300.8

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ........................... H04W 72/23; H04W 72/1268
(Continued)

(56) References Cited

U.S. PATENT DOCUMENTS

2019/0222361 A1    7/2019    Cheng et al.
2019/0223215 A1*   7/2019    Tian ................. H04W 72/0453
(Continued)

FOREIGN PATENT DOCUMENTS

CN    109729577 A    5/2019
CN    110034900 A    7/2019
(Continued)

OTHER PUBLICATIONS

Ericsson, "Summary on [AT109e][033][IIOT] Scheduling Enhancements", 3GPP TSG-RAN WG2 #109-e R2-2002294, Mar. 6, 2020; 19 total pages.
(Continued)

*Primary Examiner* — Peter G Solinsky
(74) *Attorney, Agent, or Firm* — Rimon PC

(57) ABSTRACT

This application provides an uplink signal sending method, an apparatus, and a system, and generally relates to the field of communications technologies. The uplink signal sending method includes obtaining first indication information, and determining, based on the first indication information, whether to send an uplink signal on a supplementary uplink (SUL) or an uplink (UL). The first indication information is used to indicate a SUL available time, and the SUL available time is a time in which an uplink signal can be sent on an SUL carrier in a preset period. The method is applied to a procedure in which an uplink signal is sent by using an uplink carrier, to improve flexibility in an uplink signal sending process.

20 Claims, 22 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0261424 A1* | 8/2019 | Park | H04W 72/542 |
| 2019/0313356 A1 | 10/2019 | Sandgren et al. | |
| 2021/0185719 A1* | 6/2021 | Xue | H04L 5/0092 |
| 2021/0345454 A1* | 11/2021 | Dhanapal | H04W 76/27 |
| 2022/0141869 A1* | 5/2022 | Jeon | H04W 72/0446 |
| | | | 370/329 |

FOREIGN PATENT DOCUMENTS

| | | |
|---|---|---|
| CN | 110351821 A | 10/2019 |
| WO | 2019099709 A1 | 5/2019 |
| WO | 2019160814 A1 | 8/2019 |

OTHER PUBLICATIONS

3GPP, "3rd Generation Partnership Project; Technical Specification Group Radio Access Network; NR; NR and NG-RAN Overall Description; Stage 2 (Release 16)", 3GPP TS 38.300 V16.1.0 ,Mar. 31, 2020; 133 total pages.

Huawei et al., "Correction on UL/SUL indicator in DCI format 0_0", 3GPP TSG RAN WG1 Meeting #96bis R1-1905787, Apr. 12, 2019; 4 total pages.

* cited by examiner

UPLINK SIGNAL SENDING METHOD, APPARATUS, AND SYSTEM

CROSS-REFERENCE TO RELATED APPLICATIONS

This application is a continuation of International Application No. PCT/CN2021/100683, filed on Jun. 17, 2021, which claims priority to Chinese Patent Application 202010575300.8, filed on Jun. 22, 2020. The disclosures of the aforementioned applications are hereby incorporated by reference in their entireties.

TECHNICAL FIELD

This application generally relates to the field of communications technologies, and in particular, to an uplink signal sending method, an apparatus, and a system.

BACKGROUND

In deployments of future networks, such as a fifth generation (5G) new radio (NR) system, reduced-capability user equipment (REDCAP UE) may be supported. Application scenarios of the REDCAP UE usually include, for example, industrial sensors spread throughout factories, camera devices for shooting surveillance videos, and wearable smart devices (such as smart watches). Such REDCAP UE have relatively low costs, and may be deployed in a large quantity. The REDCAP UEs may have relatively low transmit power for radio signals, and mainly perform uplink transmission during data transmission (for example, the camera apparatuses may send a large quantity of surveillance images through uplink transmission). Therefore, bulk uplink transmission of a large quantity of REDCAP UEs may occupy a relatively large network uplink transmission capacity, resulting in a need to expand the network uplink transmission capacity.

Currently, to expand the network uplink transmission capacity, NR proposes to support a supplementary uplink (SUL) carrier. Referring to FIG. 1(a), a cell may be configured with a SUL carrier in addition to a time division duplex (TDD) uplink (UL) carrier for uplink signal transmission. Generally, the SUL carrier has a lower frequency than the TDD UL carrier. For example, in FIG. 1(a), the SUL carrier operates at 1.8 GHz, and the TDD UL operates at 3.5 GHz. Due to the low frequency of the SUL, a radio signal may have a smaller propagation loss. Therefore, uplink signal transmission on the SUL carrier usually has better transmission quality and larger coverage.

To enable REDCAP UE with low costs to obtain better quality of service, the REDCAP UE may be allowed to use the SUL carrier, which helps expand the network uplink transmission capacity and improve uplink coverage. Currently, when an uplink signal is sent by using the SUL, complexity is relatively high and flexibility is relatively poor.

SUMMARY

Embodiments of this application provide an uplink signal sending method, an apparatus, and a system, to improve flexibility in an uplink signal sending process.

According to a first aspect, an embodiment of this application provides an uplink signal sending method. The method may be applied to a terminal or a chip in the terminal. The method includes obtaining first indication information, and determining, based on the first indication information, whether to send an uplink signal on a supplementary uplink (SUL) or an uplink (UL). The first indication information is used to indicate a SUL available time, and the SUL available time is a time in which an uplink signal can be sent on an SUL carrier in a preset period.

The uplink signal includes, but is not limited to, one or more of the following: uplink data transmitted by the terminal to a base station through a physical uplink shared channel (PUSCH), uplink control information (UCI) transmitted by the terminal to the base station through a physical uplink control channel (PUCCH), and a second reference signal sent by the terminal to the base station. The second reference signal may be, for example but not limited to, a reference signal that is sent by the terminal to the base station based on a configuration of the base station and that is used for channel quality measurement, such as a sounding reference signal (SRS).

For ease of description, in embodiments of this application, sending an uplink signal through a PUSCH or sending an uplink signal on a PUSCH may be referred to as sending a PUSCH for short. Similarly, sending an uplink signal (that is, uplink control information) through a PUCCH may be referred to as sending a PUCCH for short. Similarly, scheduling, by the base station, the terminal to send an uplink signal through a PUSCH may be referred to as scheduling PUSCH transmission for short, and scheduling, by the base station, the terminal to send an uplink signal through a PUCCH may be referred to as scheduling PUCCH transmission for short.

It can be learned that, based on the SUL available time, the terminal device may independently determine an uplink carrier for sending an uplink signal, so that flexibility in a process of sending the uplink signal by the terminal device can be improved.

In a possible design, the determining, based on the first indication information, whether to send an uplink signal on an SUL or a UL includes: determining, based on the first indication information and resource indication information, whether to send the uplink signal on the SUL or the UL, where the resource indication information is used to indicate a time domain resource occupied by the uplink signal.

Compared with a conventional technology in which the network device needs to indicate an uplink carrier by using a first indication field, in some embodiments, the terminal device can independently determine an uplink carrier based on the first indication information and the resource indication information, so that a manner of determining an uplink carrier is more flexible.

In some embodiments, for different uplink signals, manners of obtaining the resource indication information by the terminal device may be different, and correspondingly, manners of determining an uplink carrier may be different.

For a PUSCH and a PUCCH, the network device may schedule, by delivering downlink control information (DCI), the terminal device to send the PUSCH or the PUCCH. The resource indication information is included in the DCI. The terminal device determines, based on the resource indication information and the first indication information, an uplink carrier for sending the PUSCH or the PUCCH.

For a configured grant (CG) PUSCH, a PUCCH, and an SRS, the network device may semi-statically configure uplink transmission of the terminal device by using first radio resource control (RRC) information. The resource indication information is included in the first RRC information. The terminal device determines, based on the resource indication information and the first indication information, an uplink carrier for sending the CG PUSCH, the PUCCH, or the SRS.

In a possible design, the determining, based on the first indication information and resource indication information, whether to send the uplink signal on the SUL or the UL includes: sending the uplink signal on the SUL when a start moment is in the SUL available time; sending the uplink signal on the UL when the start moment is not in the SUL available time; sending the uplink signal on the SUL when the start moment is in the SUL available time and the time domain resource occupied by the uplink signal is in the SUL available time; sending the uplink signal on the UL when the start moment is not in the SUL available time and the time domain resource occupied by the uplink signal is not in the SUL available time; sending the uplink signal on the UL when the start moment is in a UL available time; sending the uplink signal on the SUL when the start moment is not in the UL available time; sending the uplink signal on the UL when the start moment is in the UL available time and the time domain resource occupied by the uplink signal is in the UL available time; or sending the uplink signal on the SUL when the start moment is not in the UL available time and the time domain resource occupied by the uplink signal is not in the UL available time.

The start moment is a start moment of the time domain resource occupied by the uplink signal, and the start moment is determined based on the resource indication information.

Compared with a conventional technology in which the network device needs to indicate an uplink carrier by using a first indication field, in some embodiments, the terminal device determines an uplink carrier based on the start moment of the uplink signal, so that a manner of determining an uplink carrier is more flexible.

In a possible design, the first RRC information is not signaling used to dynamically indicate the time domain resource occupied by the uplink signal, that is, the first RRC information is not used to dynamically indicate the resource indication information, but instead, the resource indication information is semi-statically configured. Therefore, the start moment of the uplink signal may not depend on the resource indication information. Therefore, the terminal device not only needs to determine whether the start moment is in the SUL available time, but also needs to determine whether the start moment is in the time domain resource indicated by the resource indication information, to determine an uplink carrier for uplink transmission.

The determining, based on the first indication information and resource indication information, whether to send the uplink signal on the SUL or the UL includes: sending the uplink signal on the SUL when the start moment of the uplink signal is in the SUL available time and is in an SUL time domain resource indicated by the resource indication information; or sending the uplink signal on the UL when the start moment is not in the SUL available time and is in a UL time domain resource indicated by the resource indication information.

Alternatively, the terminal device may determine only whether the start moment of the uplink signal is in the SUL available time, to determine an uplink carrier. The determining, based on the first indication information and resource indication information, whether to send the uplink signal on the SUL or the UL includes: sending the uplink signal on the SUL when the start moment of the uplink signal is in the SUL available time; or sending the uplink signal on the UL when the start moment is not in the SUL available time.

Alternatively, the determining, based on the first indication information and resource indication information, whether to send the uplink signal on the SUL or the UL includes: sending the uplink signal on the UL when the start moment of the uplink signal is in the LTL available time and is in the UL time domain resource indicated by the resource indication information; or sending the uplink signal on the SUL when the start moment is not in the UL available time and is in the SUL time domain resource indicated by the resource indication information.

Alternatively, the terminal device may determine only whether the start moment of the uplink signal is in the UL available time, to determine an uplink carrier. The determining, based on the first indication information and resource indication information, whether to send the uplink signal on the SUL or the UL includes: sending the uplink signal on the UL when the start moment of the uplink signal is in the UL available time; or sending the uplink signal on the SUL when the start moment is not in the UL available time.

The SUL time domain resource is a time domain resource on the SUL carrier, and the UL time domain resource is a time domain resource on a UL carrier.

The resource indication information may configure only the SUL time domain resource of the terminal device or configure only the UL time domain resource.

Alternatively, in some other embodiments, the resource indication information in the first RRC information may configure the SUL time domain resource and the UL time domain resource. The resource indication information includes a time domain resource that can be used when the uplink signal (that is, the SRS/CG PUSCH/PUCCH) is sent on the UL carrier, and a time domain resource that can be used when the uplink signal is sent on the SUL carrier. Compared with a conventional technology in which only an SUL resource or a UL resource can be semi-statically configured by using RRC, in this application, the SUL time domain resource and the UL time domain resource can be semi-statically configured by using RRC, so that the terminal device may use the SUL time domain resource and the UL time domain resource, thereby improving resource usage.

In a possible design, the method further includes: receiving DCI, where the DCI includes the resource indication information.

The DCI is used to schedule PUSCH transmission, and the resource indication information is used to indicate a time domain resource occupied by the PUSCH.

Alternatively, the DCI is used to schedule physical downlink shared channel (PDSCH) transmission, and the resource indication information is used to indicate a time domain resource occupied by an uplink feedback corresponding to the PDSCH.

In a possible design, the method further includes: receiving first RRC information, where the first RRC information includes the resource indication information. The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to a second aspect, this application provides an uplink signal sending method. The method may be applied to a network device or a chip in the network device. The method includes: determining first indication information, and sending the first indication information to a terminal device. The first indication information is used to indicate a SUL available time, and the SUL available time is a time in which an uplink signal can be sent on an SUL carrier in a preset period.

In a possible design, the method further includes: sending DCI to the terminal device, where the DCI includes resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In a possible design, the method further includes: sending first RRC information to the terminal device, where the first RRC information includes resource indication information.

The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to a third aspect, this application provides an uplink signal sending method. The method may be applied to a terminal or a chip in the terminal. The method includes: obtaining first indication information, and determining, based on the first indication information, whether to send an uplink signal on an SUL or an UL. The first indication information is used to indicate a UL available time, and the UL available time is a time in which an uplink signal can be sent on a UL carrier in a preset period.

In a possible design, the first indication information is further used to indicate an SUL available time.

In a possible design, the determining, based on the first indication information, whether to send an uplink signal on an SUL or a UL includes: determining, based on the first indication information and resource indication information, whether to send the uplink signal on the SUL or the UL, where the resource indication information is used to indicate a time domain resource occupied by the uplink signal.

In a possible design, the determining, based on the first indication information and resource indication information, whether to send the uplink signal on the SUL or the UL includes: sending the uplink signal on the UL when a start moment is in the UL available time; sending the uplink signal on the SUL when the start moment is not in the UL available time; sending the uplink signal on the SUL when the start moment is in the SUL available time; sending the uplink signal on the UL when the start moment is not in the SUL available time; sending the uplink signal on the UL when the start moment is in the UL available time and the time domain resource occupied by the uplink signal is in the UL available time; sending the uplink signal on the SUL when the start moment is not in the UL available time and the time domain resource occupied by the uplink signal is not in the UL available time; sending the uplink signal on the SUL when the start moment is in the SUL available time and the time domain resource occupied by the uplink signal is in the SUL available time; or sending the uplink signal on the UL when the start moment is not in the SUL available time and the time domain resource occupied by the uplink signal is not in the SUL available time.

The start moment is a start moment of the time domain resource occupied by the uplink signal, and the start moment is determined based on the resource indication information.

In a possible design, the determining, based on the first indication information and resource indication information, whether to send the uplink signal on the SUL or the UL includes: sending the uplink signal on the SUL when a start moment of the uplink signal is in the SUL available time and is in an SUL time domain resource indicated by the resource indication information; sending the uplink signal on the UL when the start moment is not in the SUL available time and is in a UL time domain resource indicated by the resource indication information; sending the uplink signal on the UL when the start moment of the uplink signal is in the UL available time and is in the UL time domain resource indicated by the resource indication information; sending the uplink signal on the SUL when the start moment is not in the UL available time and is in the SUL time domain resource indicated by the resource indication information; sending the uplink signal on the UL when the start moment of the uplink signal is in the UL available time; sending the uplink signal on the SUL when the start moment is not in the UL available time; sending the uplink signal on the SUL when the start moment of the uplink signal is in the SUL available time; or sending the uplink signal on the UL when the start moment is not in the SUL available time.

The SUL time domain resource is a time domain resource on an SUL carrier, and the UL time domain resource is a time domain resource on the UL carrier.

The resource indication information may configure only the SUL time domain resource of the terminal device or configure only the UL time domain resource.

Alternatively, in some other embodiments, the resource indication information in the first RRC information may configure the SUL time domain resource and the UL time domain resource. The resource indication information includes a time domain resource that can be used when the uplink signal (that is, the SRS/CG PUSCH/PUCCH) is sent on the UL carrier, and a time domain resource that can be used when the uplink signal is sent on the SUL carrier.

In a possible design, the method further includes: receiving DCI, where the DCI includes the resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In a possible design, the method further includes: receiving first RRC information, where the first RRC information includes the resource indication information.

The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to a fourth aspect, this application provides an uplink signal sending method. The method may be applied to a network device or a chip in the network device. The method includes: determining first indication information, and sending the first indication information to a terminal device. The first indication information is used to indicate a UL available time, and the UL available time is a time in which an uplink signal can be sent on a UL carrier in a preset period.

In a possible design, the first indication information is further used to indicate an SUL available time.

In a possible design, the method further includes: sending DCI to the terminal device, where the DCI includes resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In a possible design, the method further includes: sending first RRC information to the terminal device, where the first RRC information includes resource indication information.

The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to a fifth aspect, an embodiment of this application provides a communications apparatus. The apparatus may be a terminal or a chip in the terminal. The apparatus includes: a transceiver module, configured to obtain first indication information, and determine, based on the first indication information, whether to send an uplink signal on an SUL or an UL. The first indication information is used to indicate a SUL available time, and the SUL available time is a time in which an uplink signal can be sent on an SUL carrier in a preset period.

In a possible design, the processing module being configured to determine, based on the first indication information, whether to send an uplink signal on an SUL or a UL includes: being configured to determine, based on the first indication information and resource indication information, whether to send the uplink signal on the SUL or the UL, where the resource indication information is used to indicate a time domain resource occupied by the uplink signal.

In a possible design, the processing module being configured to determine, based on the first indication information and resource indication information, whether to send the uplink signal on the SUL or the UL includes: being configured to send the uplink signal on the SUL when a start moment is in the SUL available time; or send the uplink signal on the UL when the start moment is not in the SUL available time.

The start moment is a start moment of the time domain resource occupied by the uplink signal, and the start moment is determined based on the resource indication information.

In a possible design, the processing module being configured to determine, based on the first indication information and resource indication information, whether to send the uplink signal on the SUL or the UL includes: being configured to send the uplink signal on the SUL when a start moment of the uplink signal is in the SUL available time and is in an SUL time domain resource indicated by the resource indication information; or send the uplink signal on the UL when the start moment is not in the SUL available time and is in a UL time domain resource indicated by the resource indication information.

The SUL time domain resource is a time domain resource on the SUL carrier, and the UL time domain resource is a time domain resource on a UL carrier.

In a possible design, the resource indication information may configure only the SUL time domain resource of the terminal device or configure only the UL time domain resource.

Alternatively, in some other designs, the resource indication information in the first RRC information may configure the SUL time domain resource and the UL time domain resource. The resource indication information includes a time domain resource that can be used when the uplink signal (that is, the SRS/CG PUSCH/PUCCH) is sent on the UL carrier, and a time domain resource that can be used when the uplink signal is sent on the SUL carrier. Compared with a conventional technology in which only an SUL resource or a UL resource can be semi-statically configured by using RRC, in this application, the SUL time domain resource and the UL time domain resource can be semi-statically configured by using RRC, so that the terminal device may use the SUL time domain resource and the UL time domain resource, thereby improving resource usage.

In a possible design, the processing module is further configured to control the transceiver module to receive DCI, where the DCI includes the resource indication information.

The DCI is used to schedule PUSCH transmission, and the resource indication information is used to indicate a time domain resource occupied by the PUSCH. Alternatively, the DCI is used to schedule PDSCH transmission, and the resource indication information is used to indicate a time domain resource occupied by an uplink feedback corresponding to the PDSCH.

In a possible design, the processing module is further configured to control the transceiver module to receive first RRC information, where the first RRC information includes the resource indication information. The first RRC information is used to configure an SRS, and the resource indication information is used to indicate a time domain resource occupied by the SRS. Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to a sixth aspect, this application provides a communications apparatus. The apparatus may be a network device, or may be used in matching with the network device, to support the network device in implementing a function of the network device. For example, the apparatus may be a chip in the network device. The apparatus includes a processing module and a transceiver module.

The processing module is configured to determine first indication information.

The transceiver module is configured to send the first indication information to a terminal device. The first indication information is used to indicate a SUL available time, and the SUL available time is a time in which an uplink signal can be sent on an SUL carrier in a preset period.

In a possible design, the processing module is further configured to control the transceiver module to send DCI to the terminal device, where the DCI includes resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In a possible design, the processing module is further configured to control the transceiver module to send first RRC information to the terminal device, where the first RRC information includes resource indication information.

The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to a seventh aspect, this application provides a communications apparatus. The apparatus includes: a transceiver module, configured to obtain first indication information; and a processing module, configured to determine, based on the first indication information, whether to send an uplink signal on an SUL or a UL. The first indication information is used to indicate a UL available time, and the UL available time is a time in which an uplink signal can be sent on a UL carrier in a preset period.

In a possible design, the first indication information is further used to indicate an SUL available time.

In a possible design, the processing module being configured to determine, based on the first indication information, whether to send an uplink signal on an SUL or a UL includes: being configured to determine, based on the first indication information and resource indication information, whether to send the uplink signal on the SUL or the UL, where the resource indication information is used to indicate a time domain resource occupied by the uplink signal.

In a possible design, the processing module being configured to determine, based on the first indication information and resource indication information, whether to send the uplink signal on the SUL or the UL includes: being configured to send the uplink signal on the UL when a start moment is in the UL available time, send the uplink signal on the SUL when the start moment is not in the UL available time; send the uplink signal on the SUL when the start moment is in the SUL available time; or send the uplink signal on the UL when the start moment is not in the SUL available time.

The start moment is a start moment of the time domain resource occupied by the uplink signal, and the start moment is determined based on the resource indication information.

In a possible design, the processing module being configured to determine, based on the first indication information and resource indication information, whether to send the uplink signal on the SUL or the UL includes: being configured to send the uplink signal on the SUL when a start moment of the uplink signal is in the SUL available time and is in an SUL time domain resource indicated by the resource indication information; send the uplink signal on the UL when the start moment is not in the SUL available time and is in a UL time domain resource indicated by the resource indication information; send the uplink signal on the UL when the start moment of the uplink signal is in the UL available time and is in the UL time domain resource indicated by the resource indication information; or send the uplink signal on the SUL when the start moment is not in the UL available time and is in the SUL time domain resource indicated by the resource indication information.

The SUL time domain resource is a time domain resource on an SUL carrier, and the UL time domain resource is a time domain resource on the UL carrier.

In a possible design, the resource indication information may configure only the SUL time domain resource of the terminal device or configure only the UL time domain resource.

Alternatively, in some other possible designs, the resource indication information in the first RRC information may configure the SUL time domain resource and the UL time domain resource. The resource indication information includes a time domain resource that can be used when the uplink signal (that is, the SRS/CG PUSCH/PUCCH) is sent on the UL carrier, and a time domain resource that can be used when the uplink signal is sent on the SUL carrier.

In a possible design, the processing module is further configured to control the transceiver module to receive DCI, where the DCI includes the resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In a possible design, the processing module is further configured to control the transceiver module to receive first RRC information, where the first RRC information includes the resource indication information.

The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

According to an eighth aspect, this application provides a communications apparatus. The apparatus may be a network device, or may be used in matching with the network device, to support the network device in implementing any function in the fourth aspect. For example, the apparatus may be a chip in the network device. The apparatus includes a processing module and a transceiver module.

The processing module is configured to determine first indication information.

The transceiver module is configured to send the first indication information to a terminal device. The first indication information is used to indicate a UL available time, and the UL available time is a time in which an uplink signal can be sent on a UL carrier in a preset period.

In a possible design, the first indication information is further used to indicate an SUL available time.

In a possible design, the transceiver module is further configured to send DCI to the terminal device, where the DCI includes resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In a possible design, the transceiver module is further configured to send first RRC information to the terminal device, where the first RRC information includes resource indication information.

The first RRC information is used to configure an SRS, and the resource indication information is used to indicate a time domain resource occupied by the SRS.

Alternatively, the first RRC information is used to configure an uplink CG PUSCH, and the resource indication information is used to indicate a time domain resource occupied by the CG PUSCH.

Alternatively, the first RRC information is used to configure a PUCCH, and the resource indication information is used to indicate a time domain resource occupied by the PUCCH.

In a possible design of any one of the foregoing aspects, the SUL available time does not overlap the UL available time, and the UL available time is a time in which an uplink signal can be sent on the UL carrier.

Compared with a conventional technology in which time domain resources of the SUL carrier and the UL carrier overlap, and an uplink carrier that needs to be used by the terminal device needs to be explicitly indicated by using a first indication field of DCI delivered by the network device, in this application, it is designed that the SUL available time does not overlap the UL available time, so that the terminal device can independently determine, based on the first indication information, the uplink carrier that needs to be used. A manner of determining an uplink carrier is more flexible, and DCI indication overheads can be reduced.

In a possible design of any one of the foregoing aspects, a time interval between the SUL available time and the UL available time is greater than or equal to a preset threshold.

In this way, by reserving a specific time interval between the SUL available time and the UL available time, a probability that the terminal device needs to perform fast carrier switching can be reduced.

In a possible design of any one of the foregoing aspects, the first indication information indicates the SUL available time by using a bitmap, and the bitmap includes N bits. The preset period includes M time units. One bit in the bitmap corresponds to at least one time unit, and a value of each bit is used to indicate whether a time unit corresponding to the bit belongs to the SUL available time. Both N and M are positive integers.

In a possible design of any one of the foregoing aspects, the first indication information includes one or more of a time length of the preset period, a start time offset, and a duration.

The start time offset is an offset value between a start moment of an SUL available time in one preset period and a start moment of the preset period.

The duration is a duration of an SUL available time in one preset period.

In a possible design of any one of the foregoing aspects, the DCI does not include a first indication field, or a quantity of bits of the first indication field is 0. The first indication field is used to indicate whether to transmit an uplink signal on the UL or the SUL. Compared with a conventional technology in which the first indication field further needs to be included in the DCI and the first indication field is used to indicate the terminal device whether to transmit the uplink signal by using the UL or the SUL, the DCI in some embodiments has smaller payload, so that DCI transmission reliability can be improved.

In a possible design of any one of the foregoing aspects, the DCI includes a first indication field. Different from the conventional technology, the first indication field in some embodiments is not used to indicate the terminal device whether to transmit the uplink signal by using the UL or the SUL, but is used to indicate other information. In this way, the DCI may indicate more information without increasing DCI payload overheads, and an indication manner is more flexible. In addition, the DCI in some embodiments does not need a change in a structure of existing DCI, which changes an existing protocol little, and can be well compatible with an existing protocol standard. In another possible manner, although the DCI includes a first indication field, the terminal device does not need to read, learn, or parse the first indication field of the DCI, thereby reducing complexity of demodulating the DCI by the terminal device, and shortening a time for parsing the DCI by the terminal device.

In a possible design of any one of the foregoing aspects, a value of a bit in the first indication field is a predefined value, for example, 0. In a possible implementation, the first indication field may be used as a check bit, to assist the UE in determining whether the DCI is correctly demodulated, thereby improving DCI transmission reliability.

According to a ninth aspect, this application provides a communications apparatus, configured to implement a function of the communications apparatus in any one of the foregoing aspects.

According to a tenth aspect, this application provides a communications apparatus. The apparatus has a function of implementing the uplink signal sending method according to any one of the foregoing aspects. The function may be implemented by hardware, or may be implemented by hardware executing corresponding software. The hardware or the software includes one or more modules corresponding to the function.

According to an eleventh aspect, a communications apparatus is provided, including a processor and a memory. The memory is configured to store computer execution instructions. When the communications apparatus runs, the processor executes the computer execution instructions stored in the memory, so that the communications apparatus performs the uplink signal sending method according to any one of the foregoing aspects.

According to a twelfth aspect, a communications apparatus is provided, including a processor. The processor is configured to couple to a memory and read instructions in the memory, and then perform, according to the instructions, the uplink signal sending method according to any one of the foregoing aspects.

According to a thirteenth aspect, an embodiment of this application provides a communications apparatus. The apparatus may be a chip system. The chip system includes a processor, and may further include a memory, to implement a function of the method described in any one of the foregoing aspects. The chip system may include a chip, or may include a chip and another discrete component.

According to a fourteenth aspect, a communications apparatus is provided. The apparatus may be a circuit system, the circuit system includes a processing circuit, and the processing circuit is configured to perform the uplink signal sending method according to any one of the foregoing aspects.

According to a fifteenth aspect, an embodiment of this application further provides a computer-readable storage medium, including instructions. When the instructions are run on a computer, the computer is enabled to perform the method according to any one of the foregoing aspects.

According to a sixteenth aspect, an embodiment of this application further provides a computer program product, including instructions. When the instructions are nm on a computer, the computer is enabled to perform the method according to any one of the foregoing aspects.

According to a seventeenth aspect, an embodiment of this application provides a system. The system includes a communications apparatus (that is, the communications apparatus in any one of the possible designs of the fifth aspect) that performs the uplink signal sending method in any one of the first aspect or the possible designs of the first aspect, and a communications apparatus (that is, the communications apparatus according to any one of the possible designs of the sixth aspect) that performs the uplink signal sending method in any one of the second aspect or the possible designs of the second aspect. Alternatively, the system includes a communications apparatus (that is, the communications apparatus in any one of the possible designs of the seventh aspect) that performs the uplink signal sending method in any one of the third aspect or the possible designs of the third aspect, and a communications apparatus (that is, the communications apparatus according to any one of the possible designs of the eighth aspect) that performs the uplink signal sending method in any one of the fourth aspect or the possible designs of the fourth aspect.

DESCRIPTION OF EMBODIMENTS

In the specification and accompanying drawings of this application, the terms "first", "second", and the like are intended to distinguish between different objects or distinguish between different processing of a same object, but do not indicate a particular order of the objects.

"At least one" means one or more.

"A plurality of" refers to two or more than two.

"And/or" describes an association relationship between associated objects, and represents that three relationships may exist. For example, A and/or B may represent the following cases: Only A exists, both A and B exist, and only B exists, where A and B may be singular or plural.

The character "/" generally indicates that associated objects are in an "OR" relationship. For example, A/B may indicate A or B.

In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that, in embodiments of this application, the word "exemplary" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example", "for example" is intended to present a relative concept in a specific manner.

In the specification and the accompanying drawings of this application, "of", "relevant", and "corresponding" may be used interchangeably sometimes. It should be noted that they mean the same when a difference between them is not emphasized.

Figure 4:
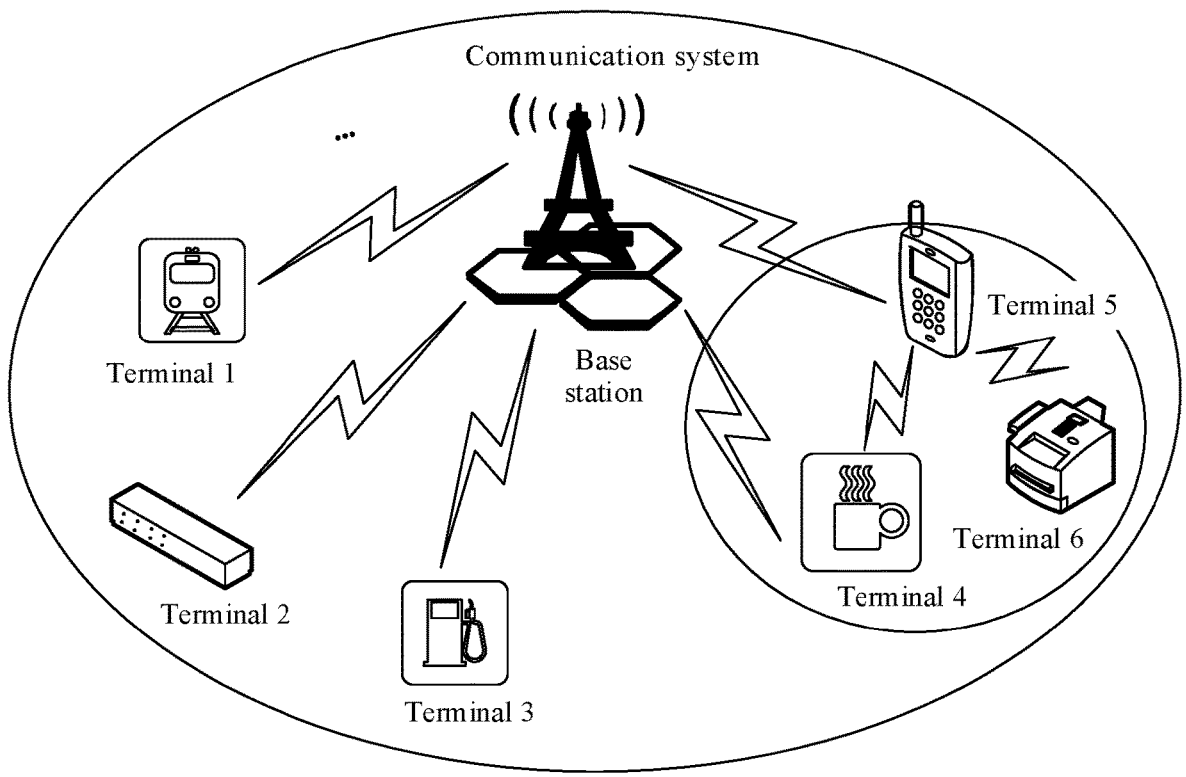
FIG. 4 is a schematic diagram of an architecture of a communications system according to an embodiment of this application.

An uplink signal sending method provided in embodiments of this application may be applied to a scenario with a plurality of (two or more) uplink carriers. FIG. 4 shows an architecture of a communications system to which embodiments of this application are applicable. The communications system includes a network device and one or more terminals (for example, a terminal 1 to a terminal 6 in FIG. 4) communicating with the network device.

The network device in embodiments of this application is an apparatus that is deployed in a radio access network to provide a wireless communications function. Optionally, the network device may refer to a device that communicates with a wireless terminal on an air interface of an access network by using one or more cells. An apparatus for implementing a function of the network device may be the network device, or may be an apparatus (for example, a chip in the network device) that supports the network device in implementing the function. Optionally, the network device may perform attribute management on the air interface. The base station device may coordinate attribute management of the air interface. The network device includes various forms of macro base stations or micro base stations (also referred to as small cells), such as a relay device of a relay station or a chip of the relay device, a transmission reception point (TRP), an evolved NodeB (eNB), a next-generation network node (g NodeB, gNB), and an evolvedNodeB connected to a next-generation core network (ng evolved NodeB, ng-eNB). Alternatively, in a distributed base station scenario, the network device may be a baseband unit (BBU) and a remote radio unit (RRU), or in a cloud radio access network (CRAN) scenario, the network device may be a baseband unit pool (BBU pool) and an RRU.

Optionally, the terminal in embodiments of this application may be a reduced-capability user equipment (REDCAP UE) or a terminal of another type. The REDCAP UE generally has a narrower bandwidth and a lower transmission rate. Correspondingly, the REDCAP UE has a longer battery life, lower complexity, and lower costs. Typical application scenarios of the REDCAP UE include industrial sensor networks, video surveillance, wearable devices (such as smart watches), and the like. The REDCAP UE may also be referred to as a reduced-capability new radio (NR) device, or may be referred to as NR-REDCAP UE, or new radio light user equipment (NR-light UE), or massive machine type communication (mMTC) user equipment (UE), or other names. The terminal may be a wireless terminal, or may be a wired terminal, which includes but is not limited to, a vehicle-mounted device, a wearable device, a computing device, a chip built in a computing device, or another processing device connected to a wireless modem; and may also include a cellular phone, a personal communications service (PCS) phone, a cordless telephone set, a session initiation protocol (SIP) phone, a smartphone, a personal digital assistant (PDA) computer, a tablet computer, a laptop computer, a wireless modem, a handheld device, and a wireless local loop (WLL) station. The wireless terminal may alternatively be a subscriber unit (SU), a subscriber station (SS), a mobile station (MB), a mobile, a remote station (RS), a remote terminal (RT), a user terminal (UT), a user device (UD), user equipment (UE), a wireless data card, a machine type communication (MTC) terminal, a terminal device, customer premise equipment (CPE), an access terminal (AT), an access point (AP), a user agent (UA), or the like. In embodiments of this application, an apparatus for implementing a function of the terminal may be the terminal, or may be an apparatus (for example, a chip in the terminal) that supports the terminal in implementing the function. For ease of description, in this application, the devices mentioned above are collectively referred to as terminals.

It should be noted that the term "communication" in embodiments of this application may alternatively be described as "data transmission". "information transmission", "transmission", or the like.

The communications system may be applied to a fifth-generation (5G) network that is currently being developed, for example, applied to a 5G NR system, or applied to another future network. This is not specifically limited to these embodiments, provided that at least two uplink carriers exist in a system. In different networks, the network device and the terminal in the communications system may correspond to different names. A person skilled in the art may understand that the names constitute no limitations on the devices.

In a wireless communications system, such as an NR communications system, a terminal and a base station may exchange information.

Figure 1A:
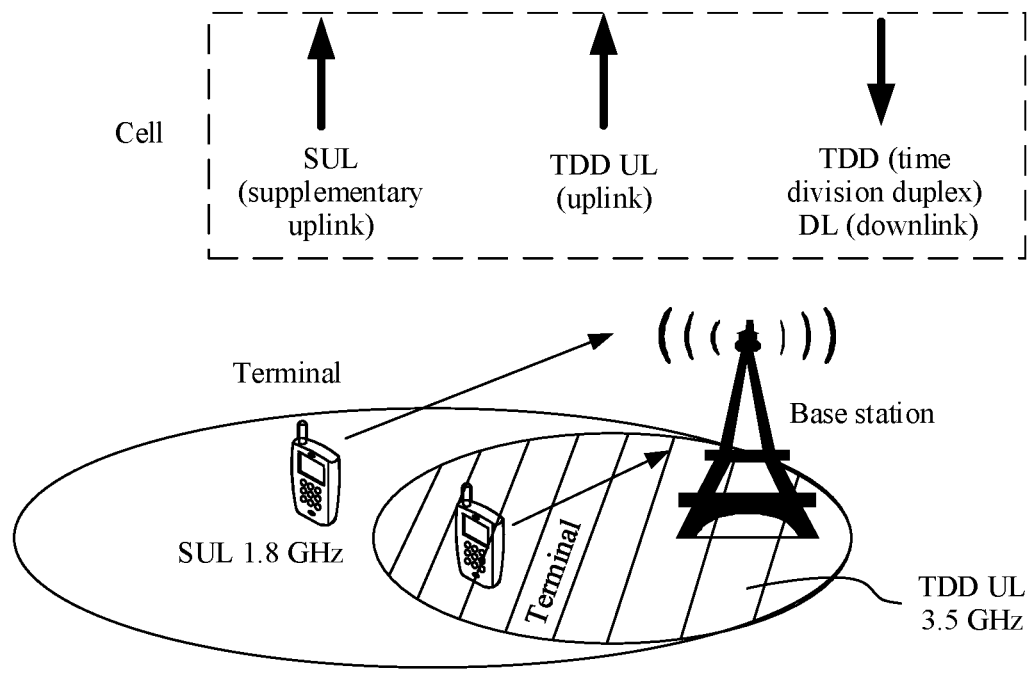
FIG. 1(a) to FIG. 1(c) are schematic diagrams of an application scenario according to an embodiment of this application.
Figure 1B:
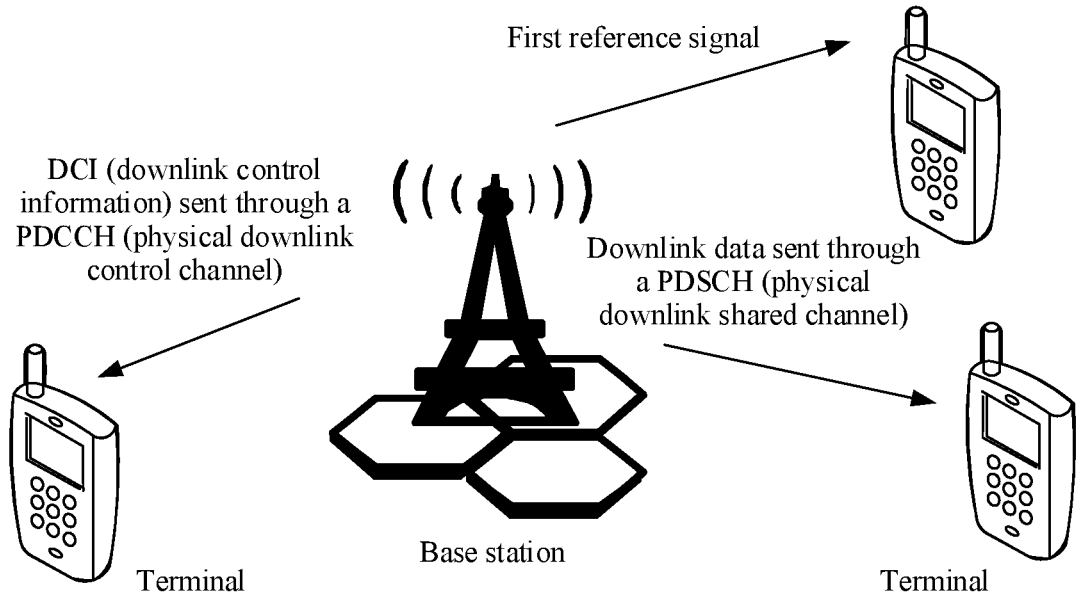

A signal sent by the base station to the terminal is referred to as a downlink signal. A signal sent by the terminal to the base station is referred to as an uplink signal. Referring to FIG. 1(b), the downlink signal includes but is not limited to one or more of the following: downlink data carried on a physical downlink shared channel (PDSCH), downlink control information (DCI) carried on a physical downlink control channel (PDCCH), and a first reference signal. The first reference signal includes but is not limited to a reference signal used by the UE to perform measurement or synchronization. For example, the first reference signal is a channel state information reference signal (CSI-RS).

Figure 1C:
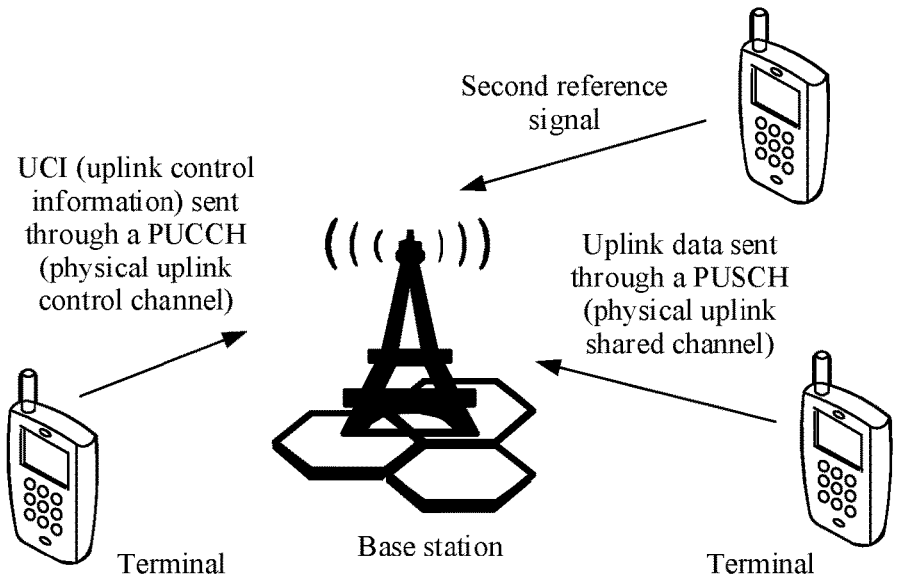

Referring to FIG. 1(c), the uplink signal includes but is not limited to one or more of the following: uplink data transmitted by the terminal to the base station through a physical uplink shared channel (PUSCH), uplink control information (UCI) transmitted by the terminal to the base station through a PUCCH, and a second reference signal sent by the terminal to the base station. The second reference signal may be, for example but not limited to, a reference signal that is sent by the terminal to the base station based on a configuration of the base station and that is used for channel quality measurement, such as a sounding reference signal (SRS).

For ease of description, in embodiments of this application, sending an uplink signal through a PUSCH or sending an uplink signal on a PUSCH may be referred to as sending a PUSCH for short. Similarly, sending an uplink signal (that is, uplink control information) through a PUCCH may be referred to as sending a PUCCH for short. Similarly, scheduling, by the base station, the terminal to send an uplink signal through a PUSCH may be referred to as scheduling PUSCH transmission for short, and scheduling, by the base station, the terminal to send an uplink signal through a PUCCH may be referred to as scheduling PUCCH transmission for short.

As described above, at present, a supplementary uplink (SUL) carrier is introduced to improve a network uplink transmission capacity. That is, a carrier with a relatively low frequency may be configured in a cell to improve uplink coverage or an uplink capacity. As shown in FIG. 1(a), coverage of a conventional uplink (UL) carrier of a cell is limited, and an SUL may be deployed in the cell, to improve uplink coverage at an edge of the cell, so that an edge user can normally perform a service, or signal strength at a center of the cell can be improved.

The UL mentioned in embodiments of this application may be written as a normal uplink (NUL) in some cases, or directly written as a UL, which are essentially the same, and represent a UL carrier in time division duplex (TDD) carriers that has a same frequency as a TDD downlink (DL) carrier. The UL in embodiments of this application may be an NUL, a UL, or a TDD UL, which are collectively referred to as a UL below.

Currently, the SUL is mainly used in the following two manners: One is switching between the UL and the SUL based on a DCI dynamic indication, and the other is a radio resource control (RRC) semi-static configuration manner.

For different uplink signals, the SUL is used in manners as follows:

(1) PUSCH

Manner 1: DCI is used to dynamically indicate whether to transmit the PUSCH on the UL or the SUL. The base station sends the DCI to the terminal. The DCI includes a first indication field, and the first indication field is used to indicate whether to transmit an uplink signal on the UL or the SUL Manner 2: The PUSCH is semi-statically configured by using RRC signaling to be transmitted only on one of the UL or the SUL. If the UE is required to switch an uplink carrier used by the PUSCH, the base station needs to send RRC signaling to the UE to perform RRC reconfiguration.

(2) PUCCH

The PUCCH is semi-statically configured by using RRC signaling to be transmitted only on one of the UL or the SUL. If the UE is required to switch an uplink carrier used by the PUCCH, the base station needs to resend RRC signaling to the UE to perform RRC reconfiguration.

(3) SRS

The SRS is semi-statically configured by using RRC signaling to be transmitted only on one of the UL or the SUL. If the UE is required to switch an uplink carrier used by the SRS, the base station needs to resend RRC signaling to the UE to perform RRC reconfiguration.

Both the RRC semi-static configuration manner and the DCI indication manner have technical problems. PUSCH transmission is used as an example. In a manner in which RRC semi-statically configures the PUSCH to use an SUL/UL carrier, first, flexibility of scheduling uplink transmission by the base station is relatively poor. The base station configures, by using RRC signaling, the PUSCH to be transmitted only by using the UL or the SUL. This does not help the base station to balance transmission load between the UL and SUL carriers, and quality of service of a terminal service is greatly affected. For example, in a scenario with a large quantity of UEs, if the PUSCH is transmitted only by using the UL, when strong interference occurs on the UL carrier, a plurality of terminals carried on the UL may go offline, and services of all the plurality of terminals are affected. Second, when the base station needs to switch an uplink carrier of the UE, the base station needs to initiate an RRC reconfiguration procedure, and the network device needs to send RRC configuration signaling to the UE, while downlink transmission overheads of RRC reconfiguration are large. In addition, an RRC reconfiguration time is relatively long, so that a service delay of the UE may be further caused, and a service requirement of the UE cannot be met.

In addition, to send uplink signals on the UL carrier and the SUL carrier at any time, radio frequency components corresponding to the UL carrier and the SUL carrier are both in an enabled state in a relatively long time, increasing power consumption of the terminal device.

Figure 2:
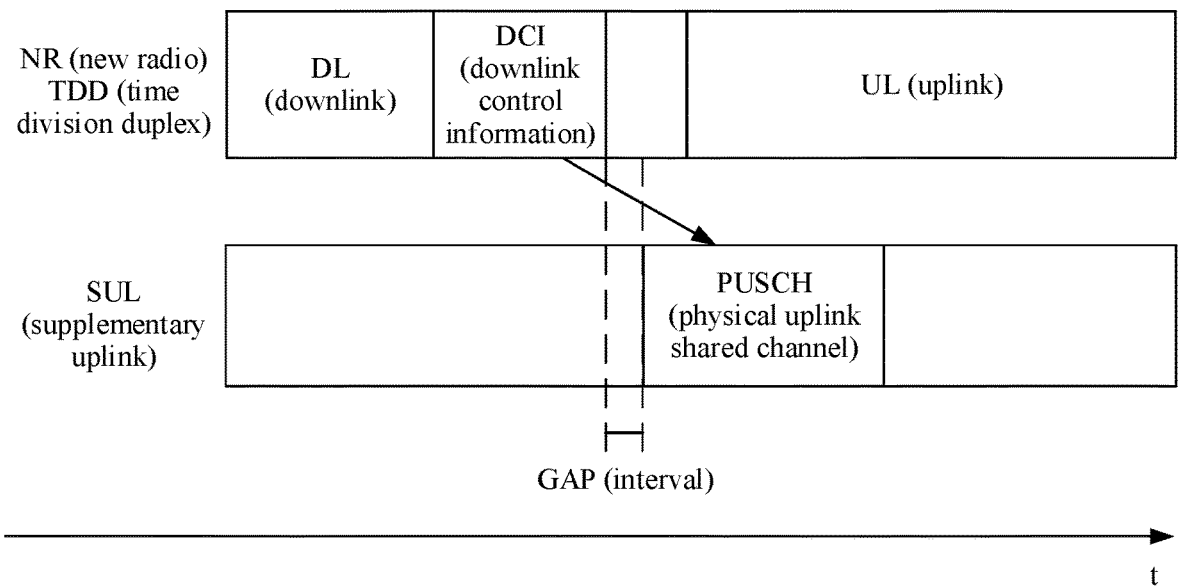
FIG. 2 and FIG. 3 are schematic diagrams of downlink control information (DCI) scheduling manners according to an embodiment of this application.

In a manner in which DCI is used to indicate the terminal to switch an uplink caner for carrying the PUSCH, in a scenario, as shown in FIG. 2, the DC is sent on a DL carrier of NR TDD carriers. The DI includes a first indication field, and the first indication field is used to schedule the UE to send the PUSCH on the SUL. The UE needs to receive and successfully demodulate the DCI, switch to the SUL carrier based on the first indication field, and send the PUSCH by using the SUL carrier. In FIG. 2, when a time interval GAP is relatively short, the terminal is required to immediately demodulate the DCI after receiving the DCI. After successful demodulation, the terminal is required to immediately switch to the SUL carrier, and send the PUSCH by using the SUL carrier. The time interval GAP may be a time interval between the DCI and the PUSCH scheduled by the DCL for example, a time interval between an end moment of sending the DCI (that is, a moment of completing sending the DCI) and a start moment of sending the PUSCH. It can be learned that, in the scenario shown in FIG. 2, requirements on both demodulation performance and carrier switching performance of the terminal are relatively high. Implementation of the terminal is relatively complex.

In addition, in the scenario shown in FIG. 2, because the first indication field in the DCI needs to be used to indicate a carrier on which an uplink signal is to be sent, the terminal device needs to complete DCI demodulation, and after completing the DCI demodulation, warm up a corresponding radio frequency component (for example, a radio frequency component corresponding to the SUL carrier). A specific time is needed to warm up the radio frequency component. Then, the warmed radio frequency component is loaded to send the uplink signal. Warming or pre-warming the radio frequency component may be understood as energizing or charging the radio frequency component or the like.

Figure 3:
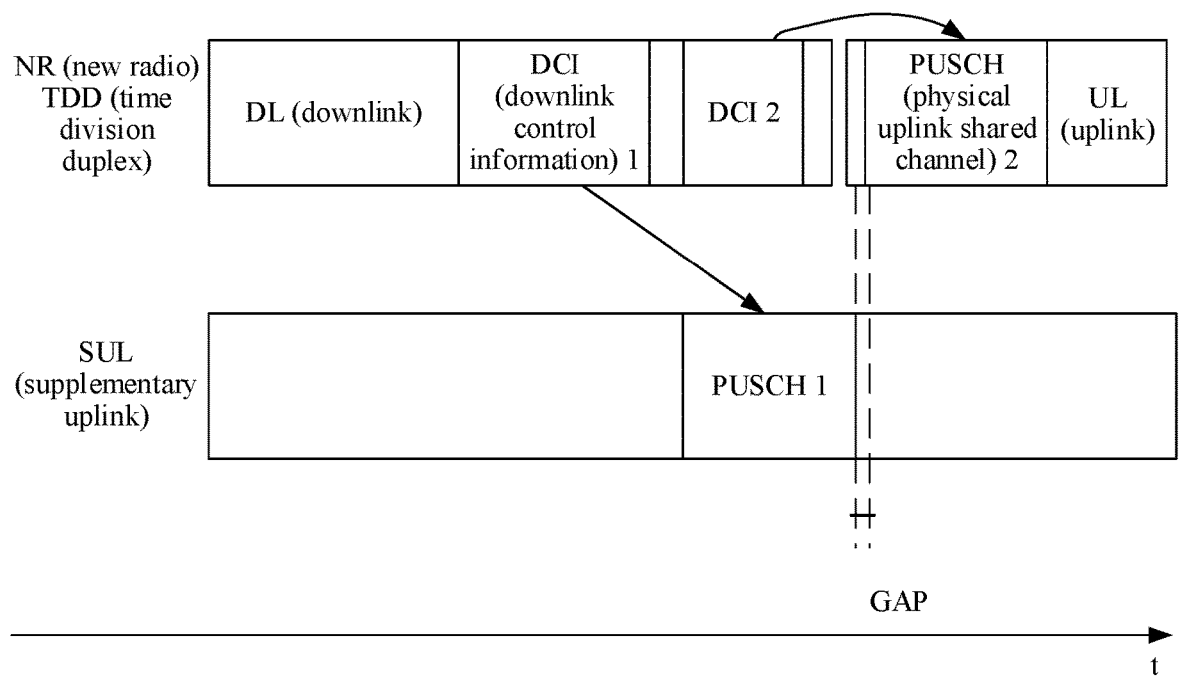

In some other scenarios, as shown in FIG. 3, the base station sends two pieces of DCI, namely, DCI 1 and DCI 2, by using an NR TDD carrier. The DCI 1 schedules the UE to send a PUSCH 1 on the SUL carrier, and the DCI 1 schedules the UE to send a PUSCH 2 on the UL carrier. In this scenario, although a time interval GAP between each DCI and a PUSCH scheduled by the DCI is relatively large, a GAP between the two PUSCHs, namely, the PUSCH 1 and the PUSCH 2, is very small. In this way, after sending the PUSCH 1 on the SUL carrier, the terminal is required to immediately switch the carrier to the UL, to send the PUSCH 2. The terminal still needs to have a relatively high carrier switching capability, which does not help reduce complexity and costs of the terminal, especially when the terminal has a relatively large traffic volume and needs to frequently perform fast switching between carriers, for example, fast switching from the SUL carrier to the UL carrier, and then fast switching back to the SUL carrier. If the terminal does not have good carrier switching performance, a service delay or even a service failure may be caused. This does not meet a service requirement of the terminal.

In addition, in this manner, an uplink carrier that needs to be used by the terminal device can be indicated only by using the first indication field of the DCI delivered by the network device, which does not have a flexible indication manner.

In addition, in a DCI dynamic scheduling scenario, to send an uplink signal on the UL carrier or the SUL carrier at any time, radio frequency components corresponding to the UL carrier and the SUL carrier are both in an enabled state in a relatively long time, increasing power consumption of the terminal device.

It can be learned that in the current RRC semi-static configuration manner and the DCI indication manner, flexibility in a process of sending an uplink signal by the terminal device is not high.

Figure 5:
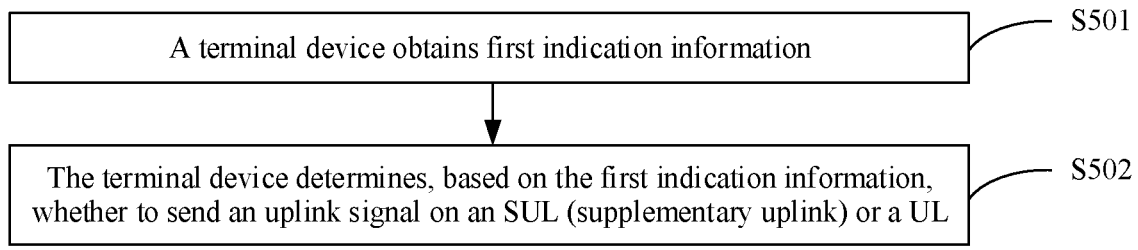
FIG. 5 and FIG. 6 are schematic flowcharts of an uplink signal sending method according to an embodiment of this application.

To resolve the foregoing technical problems, an embodiment of this application provides an uplink signal sending method. Referring to FIG. 5, the method includes the following steps.

S501. A terminal device obtains first indication information.

In a possible implementation, referring to FIG. 6, S501 may be implemented as follows: S501a. A network device determines first indication information and sends the first indication information to a terminal device. Correspondingly, the terminal device receives the first indication information from the network device.

In a possible implementation, the network device semi-statically configures the first indication information by using higher layer signaling, that is, the network device delivers the first indication information to the terminal device by using higher layer signaling. The higher layer signaling is, for example but not limited to, RRC signaling or media access control control element (MAC CE) signaling. Optionally, S501a may be implemented as follows: The network device sends second RRC information to the terminal device, where the second RRC information includes the first indication information, that is, the first indication information is a part of the second RRC information. Correspondingly, the terminal device receives the second RRC information from the network device. Alternatively, S501a may be implemented as follows: The network device sends MAC CE signaling to the terminal device, where the MAC CE signaling includes the first indication information, that is, the first indication information is a part of the MAC CE signaling. Correspondingly, the terminal device receives the MAC CE signaling from the network device. The first indication information is used to indicate an SUL available time and/or a UL available time. That is, the first indication information is used to indicate an SUL available time. Alternatively, the first indication information is used to indicate a UL available time. Alternatively, the first indication information is used to indicate an SUL available time and a UL available time. The SUL available time is a time in which an uplink signal can be sent on an SUL carrier in a preset period. The UL available time is a time in which an uplink signal can be sent on a UL carrier in the preset period. Preferably, the preset period is a TDD period. Optionally, the preset period may alternatively be N TDD periods, and N is a positive integer.

The following mainly uses an example in which the first indication information indicates the SUL available time for description. For an implementation in which the first indication information indicates the UL available time, refer to related descriptions in which the first indication information indicates the SUL available time.

It should be noted that "may" means used for, and is interpreted as "set to", "use to", or "configured to". The SUL available time is a time in which an uplink signal can be sent on the SUL carrier, that is, the SUL available time is a time that can be used to send an uplink signal on the SUL link. The UE may send an uplink signal in the SUL available time on the SUL physical link, but the UE does not necessarily use the SUL available time to send an uplink signal. In other words, the SUL available time is a configured time domain resource set on the SUL. Subsequently, when the terminal device needs to send an uplink signal, some time domain resources in the configured time domain resource set may be used, or certainly, may not be used. Optionally, the terminal device needs to determine, based on other signaling of the network device or the terminal device itself, when to send an uplink signal in the SUL available time, or whether to send an uplink signal in the SUL available time.

Similarly, the UL available time is a configured time domain resource set on the UL. Subsequently, when the terminal device needs to send an uplink signal, some time domain resources in the configured time domain resource set may be used, or may not be used. Optionally, the terminal device needs to determine, based on other signaling of the network device or the terminal device itself when to send an uplink signal in the UL available time, or whether to send an uplink signal in the UL available time.

Figure 7:
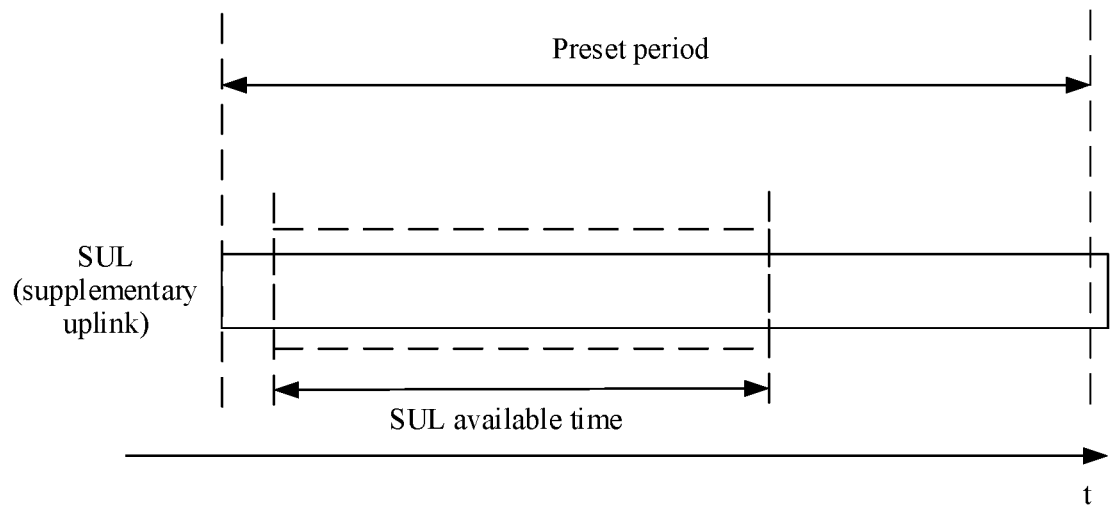
FIG. 7 to FIG. 10 are schematic diagrams of indicating an supplementary uplink (SUL)/uplink (UL) available time according to an embodiment of this application.

As shown in FIG. 7, the first indication information is used to indicate an SUL available time shown in a dashed-line box. The UE may send an uplink signal by using the SUL carrier in the SUL available time in the preset period.

In some embodiments, the first indication information may indicate the SUL available time in one of the following two manners or in combination with the following two manners.

Manner 1: The first indication information includes one or more of a time length (represented by $t_{cycle}$) of the preset period, a start time offset (represented by $t_{offset}$), and a duration (represented by $t_{last}$).

The start time offset is an offset value between a start moment of an SUL available time in one preset period and a start moment of the preset period. The duration is a duration of an SUL available time in one preset period. Optionally, the time length of the preset period is a fixed time length, for example, 10 slots or another time length. Alternatively, the time length of the preset period is specified to be a time length of an NR TDD frame period, that is, a time length of one frame. Alternatively, the time length of the preset period is set to another time length.

In some embodiments, the time length of the preset period may be referred to as a preset period length for short.

It should be noted that the terminal device generally needs to determine the SUL available time based on the three parameters: the time length of the preset period, the start time offset, and the duration. In step S501a, the network device may indicate some or all of the three parameters by using the first indication information, and a parameter not carried by the first indication information may be predefined or preconfigured. For example, the preset period length is predefined or preconfigured, or is a part of a system message, and the first indication information needs to indicate only the start time offset and the duration. For another example, both the preset period length and the duration are predefined or preconfigured, and the SUL available time in different preset periods differs only in the start time offset. In this case, the first indication information needs to indicate only the start time offset.

When the first indication information includes the three parameters, the terminal device may determine the SUL available time based on the first indication information.

When the first indication information includes some of the three parameters, the terminal device not only performs S501a to receive the first indication information from the network device, but also needs to obtain a stored predefined parameter (or referred to as a preconfigured parameter). In this way, the terminal device determines the SUL available time based on the first indication information and the predefined parameter. For example, the network device sends first indication information to the terminal device in step S501a, the first indication information includes two parameters: the time length of the preset period and the start time offset, and based on definition in a protocol, the duration parameter is preconfigured in the terminal device before delivery. The terminal device may determine the SUL available time based on the parameters (the preset period length and the start time offset) included in the first indication information received from the network device and the preconfigured parameter (e.g., the duration parameter).

Figure 8:
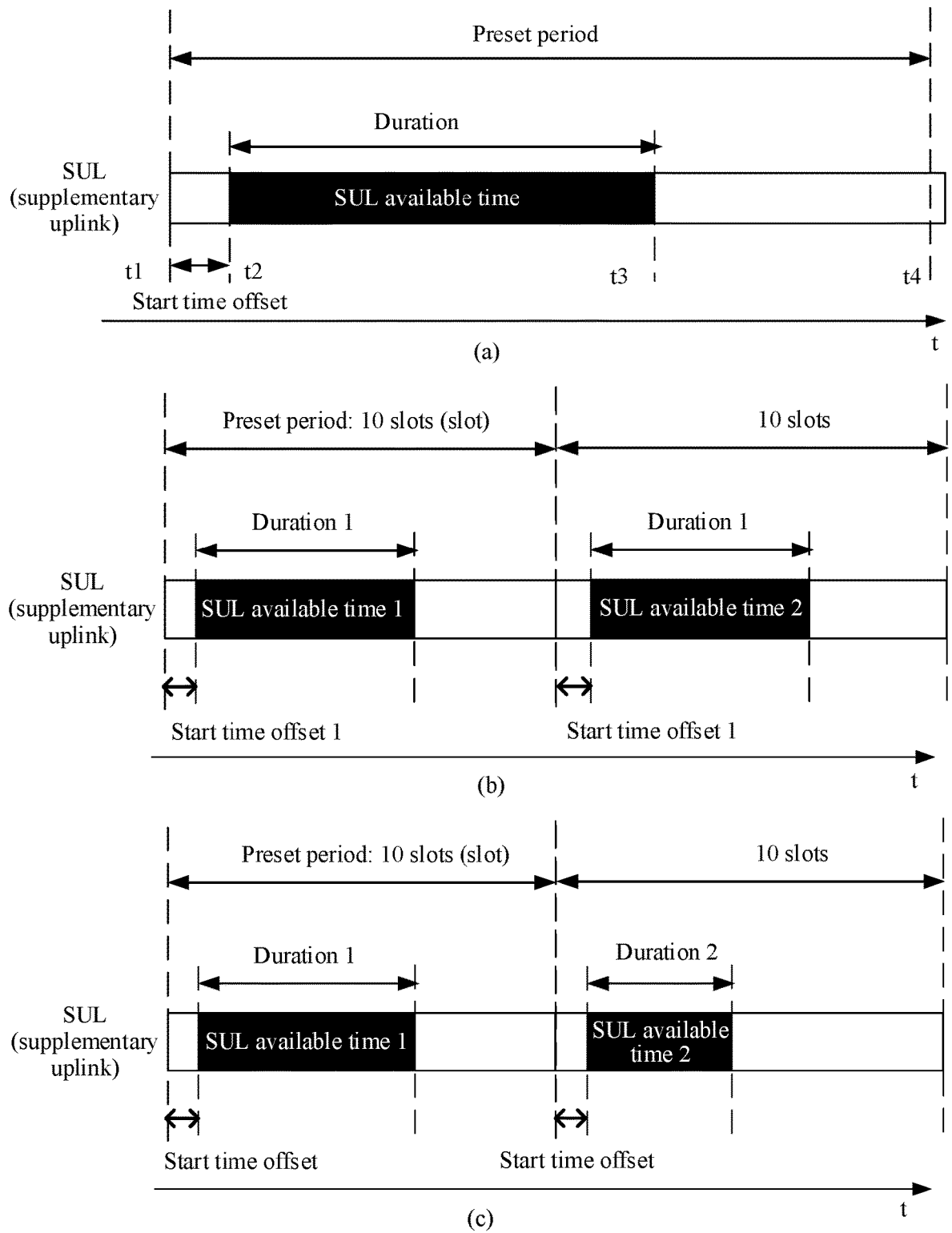
Figure 8:
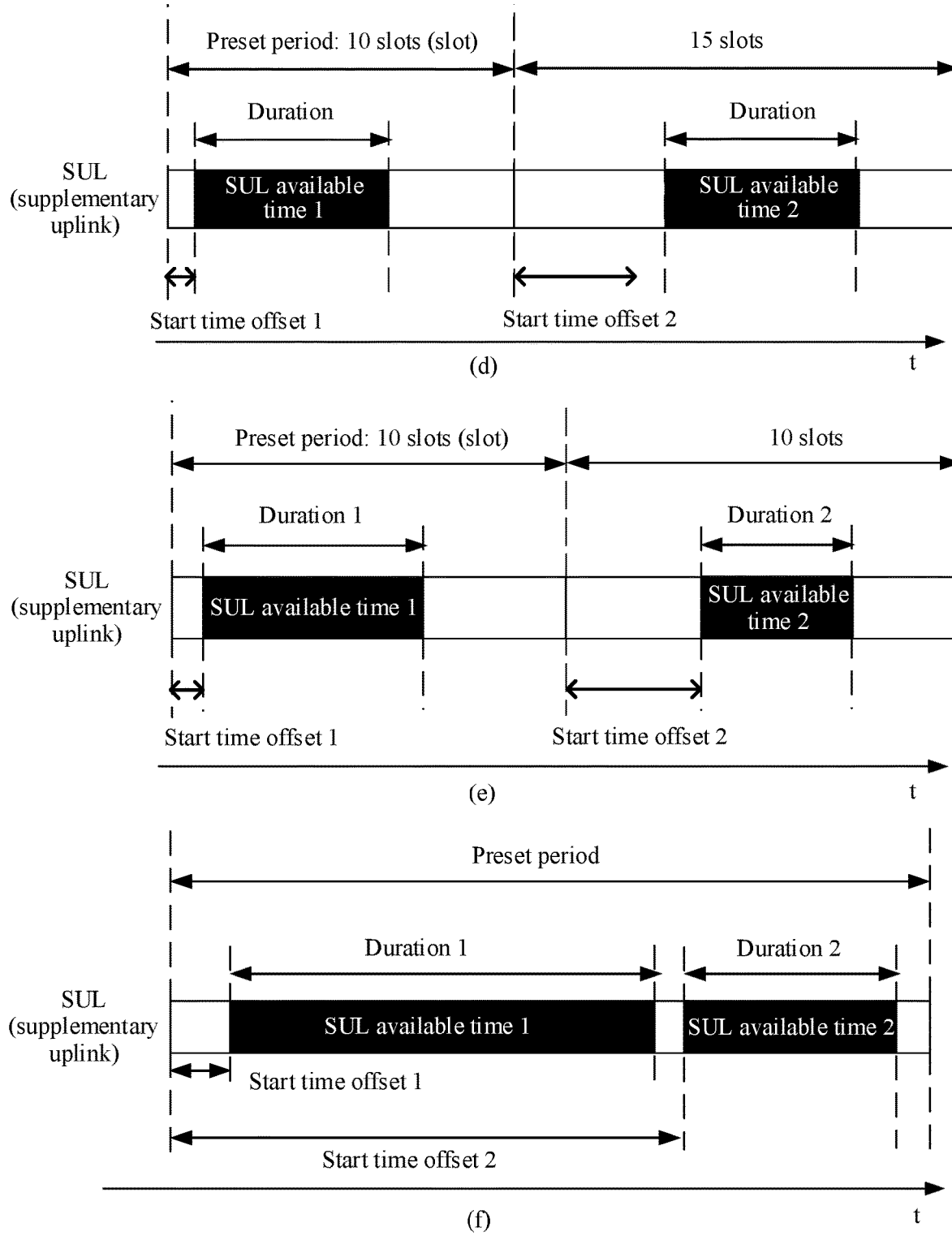

For example, referring to (a) in FIG. 8, the first indication information includes one or more parameters of the start time offset, the duration, and the preset period. The time length of the preset period is a time length between t1 and t4. The start time offset is an offset value between a start moment (t2) of the SUL available time in the preset period and a start moment (t1) of the preset period. The duration is a duration of the SUL available time in the preset period, that is, a time length between t2 and 3.

The terminal device determines the SUL available time based on the first indication information, or the terminal device determines the SUL available time based on the first indication information and the preconfigured parameter in the terminal device.

The time length of the preset period, the duration, and the start time offset may be in a slot granularity, or may be in a symbol granularity, or may be in a slot+symbol granularity, or may be in another time granularity. In a normal cyclic prefix (NCP) case, one slot includes 14 symbols. In an extended cyclic prefix (ECP) case, one slot includes 12 symbols. The duration is used as an example. In the normal CP case, the duration may be 4 slots+7 symbols (that is, 4.5 slots). The first indication information may be used to indicate that a quantity of slots is 4 and a quantity of symbols is 7. Optionally, the duration may alternatively be an integer quantity of slots. For example, the duration is 4 slots. The duration may alternatively be expressed as M slots+N symbols. M is greater than or equal to 0, N is greater than or equal to 0, and M and N are integers.

In some embodiments, another time length may also be in the slot granularity, the symbol granularity, the slot+symbol granularity, or another time granularity, for example, a subframe, a system frame, a minute, or an hour.

In some embodiments, the SUL available time has a same time domain location in different preset periods. In other words, the SUL available time has a fixed time domain location in different preset periods. For example, as shown in (b) of FIG. 8, in a first preset period with a time length of 10 slots and a second preset period with a time length of 10 slots, for both an SUL available time 1 and an SUL available time 2, a start time offset is a start time offset 1, and a duration is a duration 1.

In some other embodiments, the SUL available time has different time domain locations in different preset periods. In other words, a time domain location of the SUL available time may change in different preset periods. There are the following several possible cases:

In different preset periods, the SUL available time may have a same start time offset and different durations. For example, referring to (c) in FIG. 8, in a first preset period with a time length of 10 slots, a duration of an SUL available time 1 is a duration 1, and in a second preset period with a time length of 10 slots, a duration of an SUL available time 2 is a duration 2. Alternatively, as shown in (d) of FIG. 8, in different preset periods, the SUL available time may have a same duration and different start time offsets. Alternatively, as shown in (e) of FIG. 8, in different preset periods, the SUL available time may have different durations and different start time offsets.

It should be noted that time lengths of different preset periods may be the same or different. Using (b) in FIG. 8, (c) in FIG. 8, or (e) in FIG. 8 as an example, durations of different preset periods are 10 slots. Using (d) in FIG. 8 as an example, durations of different preset periods are different.

The first indication information may be in any one of the following forms:

1. A form may be {(preset period length $t_{cycle\_1}$, start time offset $t_{offset\_1}$, duration $t_{last\_1}$), (preset period length $t_{cycle\_1}$, start time offset $t_{cycle\_2}$, and duration $t_{last\_2}$), . . . , (preset period length $t_{cycle\_R}$, start time offset $t_{offset\_R}$, duration $t_{last\_R}$)}.

R is a variable, and a value of R is related to a quantity of SUL available times. Optionally, the value of R is equal to the quantity of SUL available times. For different values of R, values of the preset period length $t_{cycle\_R}$ may be the same or different. Similarly, for different values of R, values of the start time offset $t_{offset\_R}$ may be the same or different. For different values of R, values of the duration $t_{last\_R}$ may be the same or different.

2. Items with a same parameter value in the three parameters, namely, the preset period length $t_{cycle\_R}$, the start time offset $t_{offset\_R}$, and the duration $t_{last\_R}$, may be aggregated.

For example, for a same preset period length $t_{cycle\_R}$, the first indication information may perform indication in the following form:

{preset period length $t_{cycle\_R}$, (start time offset $t_{offset\_1}$, duration $t_{last\_1}$), (start time offset $t_{offset\_2}$, and duration $t_{last\_2}$), . . . , (start time offset $t_{offset\_R}$, duration $t_{last\_R}$)}.

That is, in a plurality of identical preset period lengths (for example, the identical preset period lengths may be 10 slots), the SUL available time may be set separately. In different preset period lengths, locations of the SUL available time are the same or different. For example, referring to (b) in FIG. 8, (c) in FIG. 8, or (e) in FIG. 8, preset period lengths are all 10 slots. Then, the SUL available time may be set at a same location or different locations in different 10 slots.

For another example, for a same preset period length $t_{cycle\_R}$ and start time offset $t_{offset\_R}$, the first indication information may perform indication in the following form:

{preset period length $t_{cycle\_R}$, start time offset $t_{offset\_R}$, (duration $t_{last\_1}$), (duration $t_{last\_2}$), . . . , (duration $t_{last\_R}$)}. For example, referring to (c) in FIG. 8, preset periods are all 10 slots, and in 10 slots of different preset periods. SUL available times has a same start time offset.

For another example, for a same preset period length $t_{cycle\_R}$, start time offset $t_{offset\_R}$, and duration $t_{last\_R}$, the first indication information may perform indication in the following form:

{preset period length $t_{cycle\_R}$, start time offset $t_{offset\_R}$, duration $t_{last\_R}$}. In this case, the SUL available time has a same location in each preset period.

There may be other examples in Form 2, and the other examples in Form 2 are not exhaustively described herein in these embodiments.

In this way, items whose parameter values are the same in the three parameters, namely, the preset period length, the start time offset, and the duration, are aggregated, so that payload of the first indication information can be reduced, to reduce signaling overheads for sending the first indication information.

When Form 1 or Form 2 is used to represent the first indication information, some parameters may be defaulted. In other words, as mentioned above, the first indication information may indicate all or some parameters of the time length of the preset period, the start time offset, and the duration. In this case, for an implementation process in which the terminal device determines the SUL available time, refer to the foregoing embodiment. Details are not described herein again.

It should be noted that, in some embodiments, that the SUL available time has a same location in different preset periods means that locations of different SUL available times relative to start moments of respective preset periods are the same, and durations of the different SUL available times are the same. Using (b) in FIG. 8 as an example, a start time offset of an SUL available time 1 relative to a start moment of a first preset period is a start time offset 1, a start time offset of an SUL available time 2 relative to a start moment of a second preset period is also the start time offset 1, and durations of the SUL available time 1 and the SUL available time 2 are both a duration 1. Such a case is described as that locations of the two SUL available times, that is, a location of the SUL available time 1 in the first preset period and a location of the SUL available time 2 in the second preset period, are the same.

In the foregoing embodiments, a manner of indicating the SUL available time is mainly described by using an example in which one preset period includes one SUL available time. In some other embodiments, one preset period includes a plurality of SUL available times. In this case, the first indication information needs to indicate a plurality of durations in one preset period and a plurality of start time offsets respectively corresponding to the plurality of durations. For example, as shown in (f) of FIG. 8, the first indication information needs to indicate a duration 1 and a start time offset 1 in a preset period to indicate an SUL available time 1, and the first indication information further needs to indicate a duration 2 and a start time offset 2 in the preset period to indicate an SUL available time 2.

Manner 2: The first indication information includes a bitmap, and the first indication information indicates the SUL available time by using the bitmap.

The bitmap includes N bits. The preset period includes M time units. One bit in the bitmap corresponds to at least one time unit, and a value of each bit is used to indicate whether a time unit corresponding to the bit belongs to the SUL available time. Both N and M are positive integers. In a possible design, a value 1 of the bit indicates that the time unit corresponding to the bit belongs to the SUL available time, and a value 0 of the bit indicates that the time unit corresponding to the bit does not belong to the SUL available time. Certainly, alternatively, the value 0 of the bit may indicate that the time unit corresponding to the bit belongs to the SUL available time, and the value 1 of the bit may indicate that the time unit corresponding to the bit does not belong to the SUL available time. Information indicated by a bit is not limited to these embodiments.

In some embodiments, in addition to obtaining the bitmap in the first indication information, the terminal device further needs to obtain one or more parameters of a preset period length, a quantity of time units corresponding to one bit in the bitmap, and a time length of one time unit. In addition, the terminal device determines the SUL available time based on the bitmap in the first indication information and the one or more parameters.

Figure 9:
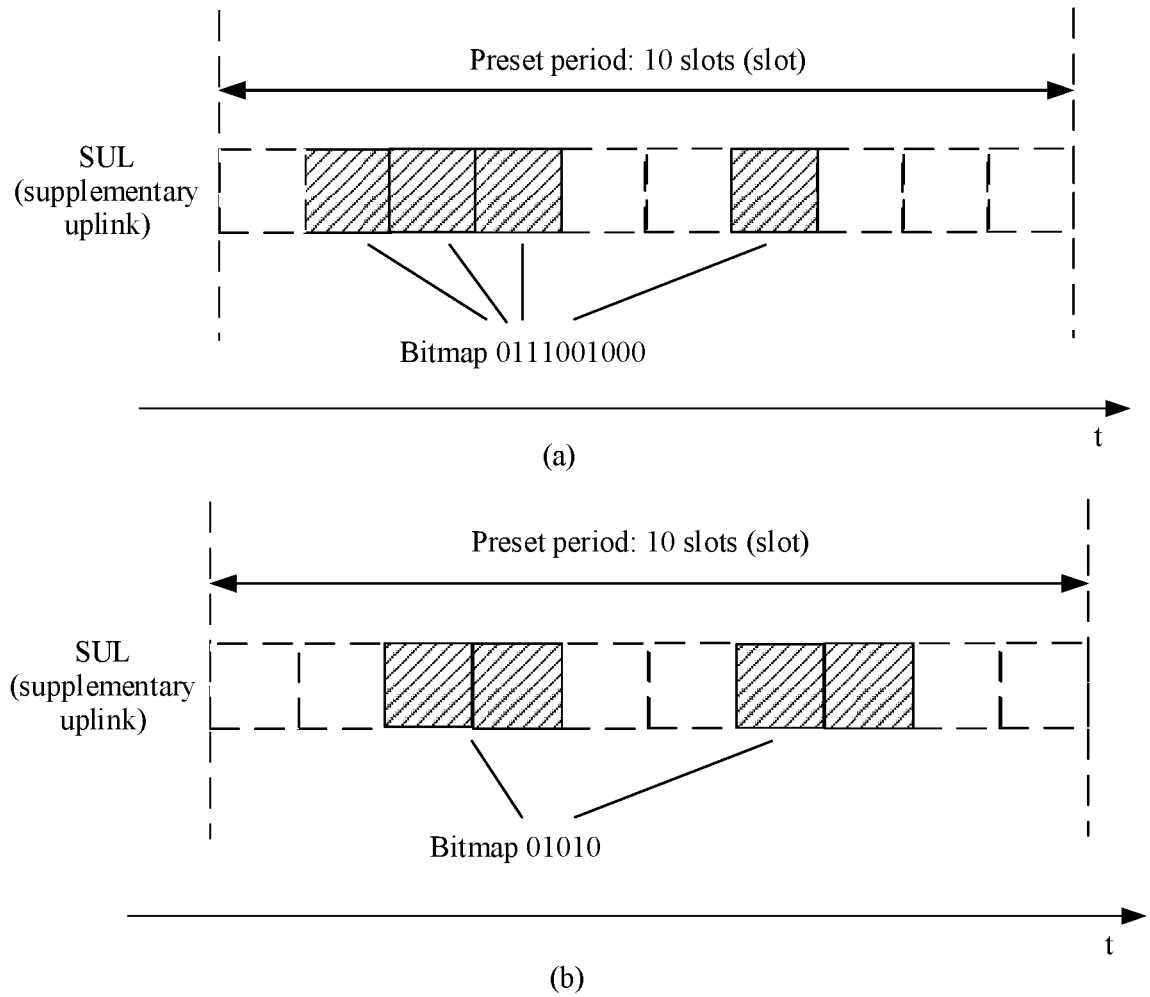

In a possible design, some or all of the three parameters, namely, the preset period length, the quantity of time units corresponding to one bit in the bitmap, and the duration of one time unit, may be preconfigured in the terminal device. When only some of the three parameters are preconfigured in the terminal device, the network device may indicate another parameter (that is, a parameter not configured in the terminal device) by using the first indication information, and the terminal device receives the first indication information, to obtain the another parameter from the first indication information. For example, the bitmap is shown in (a) of FIG. 9. The terminal receives the first indication information from the network device, the first indication information includes the bitmap and the preset period length, the bitmap is 0111001000, a quantity of bits in the bitmap is N=10, and the preset period length is $t_{cycle}$=10 slots. Then, one bit corresponds to one slot of the preset period. A value of the bit is used to indicate whether the slot corresponding to the bit belongs to the SUL available time. Assuming that the value of the bit is 1 and is used to indicate that the slot corresponding to the bit belongs to the SUL available time, the bitmap 0111001000 indicates that second, third, fourth, and seventh slots in the preset period belong to the SUL available time.

It should be noted that the time length of the time unit may be set based on a specific application scenario. For example, the time length of the time unit is set to one slot, two slots, or another time length granularity, for example, one subframe or several symbols. For example, if one time unit has a time length of one slot, the preset period (that is, 10 slots) shown in (a) of FIG. 9 includes M=10 time units.

In some embodiments, to reduce signaling overheads, when determining the bitmap, the network device reduces a quantity of bits included in the bitmap. For example, as shown in (b) of FIG. 9, the network device delivers, to the terminal device, first indication information including a bitmap 01010. One bit in the bitmap corresponds to two slots in a preset period. In this way, a 5-bit bitmap may be used to indicate an SUL available time in a preset period, that is, 10 slots. Compared with (a) in FIG. 9 in which 10 bits need to be delivered, 5 bits are delivered in (b) of FIG. 9, thereby reducing signaling overheads.

In some embodiments, to improve indication precision to achieve a more flexible manner of indicating the SUL available time, when determining the bitmap, the network device increases a quantity of bits included in the bitmap. For example, as shown in (a) of FIG. 9, the network device delivers a 10-bit bitmap to the terminal device. Compared with the 5-bit bitmap shown in (b) of FIG. 9, an indication manner of the 10-bit bitmap shown in (a) of FIG. 9 has a finer time granularity in indication.

In actual application, the network device may comprehensively consider two indicators, namely, an indication granularity and signaling overheads, to determine a quantity of bits of the bitmap.

It should be noted that for an orthogonal frequency division multiplexing (OFDM) system (for example, an NR system), time lengths of a symbol and a slot are associated with a subcarrier spacing (SCS). A length of one symbol or slot is inversely proportional to a width of the SCS. For example, when the SCS is 15 kHz, one slot has a length of 1 ms; when the SCS is 30 kHz, one slot has a length of 0.5 ms. Therefore, in the first indication information, if the SUL available time and/or the UL available time is indicated in the symbol or slot granularity, a reference SCS may be further indicated. In this way, the terminal device can accurately determine a time length of a symbol or a slot to which the SUL available time or the UL available time refers, to determine a time range of the SUL available time or the UL available time. Certainly, the reference SCS may alternatively not be indicated by using the first indication information, but instead, the reference SCS is predefined. The reference SCS is specified to be, for example, 15 kHz, or the reference SCS is specified to be the same as a reference SCS in an NR TDD period configuration.

In another possible implementation, the network device may indicate, by using one or more pieces of first indication information, a plurality of SUL available times and/or UL available times, and then indicate, by using first DCI, that at least one SUL available time and/or UL available time is effective. The first DCI may be DCI dedicated to indicating the SUL available time and/or the UL available time, or DCI (for example, DCI in a format 2_6) used to indicate energy saving information, or other UE-specific DCI or UE group-specific DCI.

There may also be another indication method, provided that the UE can accurately determine a time in which transmission can be performed on the SUL or the UL.

It should be noted that, the UL available time may be a time that is determined based on an uplink-downlink slot configuration in a conventional technology and in which an uplink signal can be sent on the UL carrier, for example, a UL resource indicated in TDD configuration information (such as tdd-UL-DL-ConfigurationCommon) broadcast by the network device and/or transmission direction indication information (such as tdd-UL-DL-ConfigurationDedicated) independently configured for the terminal, or may be a time that is indicated by the first indication information and in which an uplink signal can be sent on the UL carrier. That is, the UL available time is indicated by indicating at least one of a preset period, a duration, and a start time offset. Alternatively, the UL available time is indicated by using a bitmap. For an implementation of indicating the UL available time by using the first indication information, refer to related descriptions of the first indication information indicating the SUL available time. Details are not described herein in these embodiments.

In some embodiments, one piece of first indication information may be used to indicate only the SUL available time, or indicate only the UL available time, or indicate the SUL available time and the UL available time. In actual implementation, two pieces of first indication information may alternatively be used to indicate the SUL available time and the UL available time respectively.

In some embodiments, optionally, the SUL available time does not overlap the UL available time. The UL available time is a time in which an uplink signal can be sent on the UL carrier.

Compared with a conventional technology in which time domain resources of the SUL carrier and the UL carrier overlap, and an uplink carrier that needs to be used by the terminal device needs to be explicitly indicated by the network device by delivering a first indication field, in this application, it is designed that the SUL available time does not overlap the UL available time, so that the terminal device can independently determine, based on the first indication information, the uplink carrier that needs to be used. A manner of determining an uplink carrier is more flexible, and DCI indication overheads can be reduced.

Further, considering that the terminal device usually requires some time, for example, 140 µs, to perform carrier switching between the UL and the SUL, in some embodiments, an interval is reserved between the SUL available time and the UL available time. The time interval between the SUL available time and the UL available time is greater than or equal to a preset threshold. The preset threshold may be determined based on a specific application scenario. For example, the preset threshold may be 1 to 2 symbols, or 1 to 2 slots, or 1 to 2 subframes. Referring to (a) in FIG. 10, a time interval 1 between an SUL available time 1 and a UL available time 1 and a time interval 2 between the UL available time 1 and an SUL available time 2 should both be greater than or equal to the preset threshold. In a possible implementation, the preset threshold may be a value related to the SCS. For example, when the SCS is $2^u*15$ kHz, the preset threshold may be K+N*u symbols (u, K, and N are non-negative integers). In a feasible example, K=1, and N=1. Then, when u=0, the SCS is 15 kHz, and the preset threshold is 1 symbol (that is, 1 ms). When u=1, the SCS is 30 kHz, and the preset threshold is 2 symbols (that is, 1 ms). This method has the following beneficial effect: Considering that a time domain length of each symbol is inversely proportional to the subcarrier spacing, in this implementation, the preset threshold is an absolute value that does not change with a change of the SCS. For example, in the foregoing example, when the SCS is 15 kHz or 30 kHz, the preset threshold is 1 ins in both cases. In this way, the preset threshold may be flexibly designed based on a hardware processing speed without being affected by a value of the SCS. Certainly, the preset threshold may alternatively be designed in other manners without being affected by the value of the SCS.

In this way, by reserving a specific time interval between the SUL available time and the UL available time, a probability that the terminal device needs to perform fast carrier switching can be reduced. For example, in (a) of FIG. 10, due to a reserved time interval, when the terminal device sends an uplink signal in an SUL available time 1 by using the SUL carrier, at least after a time interval 1, the terminal device can switch to the UL carrier and send an uplink signal by using the UL carrier. That is, the terminal device does not need to switch from the SUL carrier to the UL carrier in a relatively short time. The terminal device does not need to have a high carrier switching capability, thereby reducing complexity of the terminal device.

Figure 10:
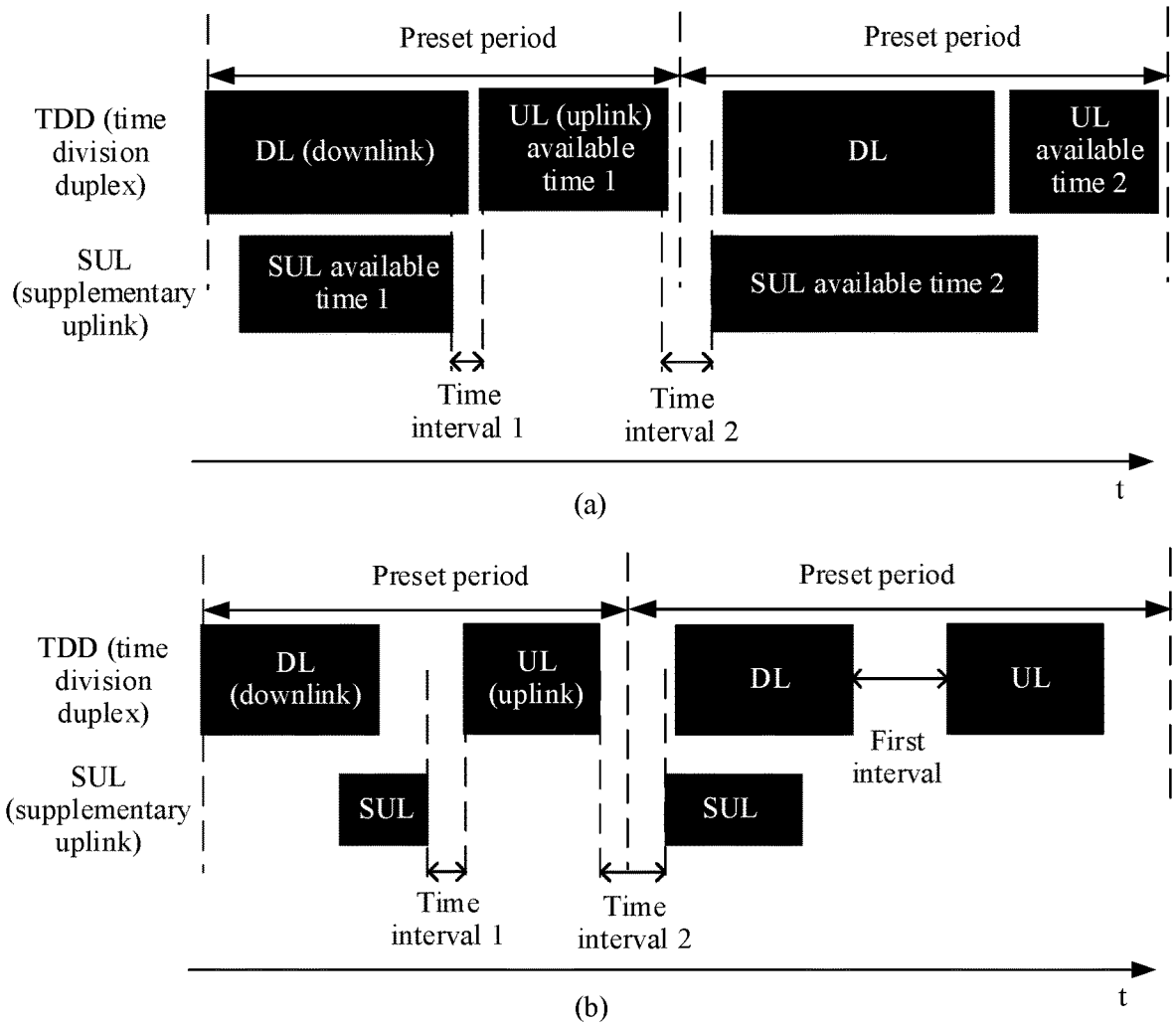

In some other embodiments, in (b) of FIG. 10, the SUL available time partially overlaps a first interval. The first interval is a time interval between a DL and the UL.

S502. The terminal device determines, based on the first indication information, whether to send an uplink signal on the SUL or the UL.

For example, the terminal device learns, by reading the preset period length, the start time offset, and the duration in the first indication information, the SUL available time and/or the UL available time shown in (a) of FIG. 10. In this way, when the terminal device needs to send an uplink signal, the terminal device may send the uplink signal in the SUL available time on the SUL carrier, or send the uplink signal in the UL available time on the UL carrier.

According to the uplink signal sending method provided in some embodiments, the terminal device obtains the first indication information, and determines, based on the SUL available time and/or the UL available time indicated by the first indication information, an uplink carrier for sending an uplink signal. Compared with a conventional technology in which an uplink carrier is usually indicated by using a first indication field delivered by the network device, leading to poor flexibility in an uplink signal sending process, in some embodiments, the terminal device may independently determine, based on the SUL available time and/or the UL available time, an uplink carrier for sending an uplink signal, thereby improving flexibility in an uplink signal sending process.

In addition, because the terminal device clearly learns a time in which an uplink signal can be sent on the SUL carrier or the UL carrier, a radio frequency component may be pre-warmed up, and the radio frequency component has a longer startup time. In addition, the terminal device does not need to quickly complete DCI demodulation, so that the terminal device can have a lower data processing capability, thereby achieving low complexity and low costs. For example, as shown in FIG. 13(*a*), the terminal device receives DCI, and when demodulating the DCI, the terminal device may have not learned a specific uplink carrier on which an uplink signal is to be transmitted. According to the technical solution in some embodiments, the terminal device may clearly learn a time in which an uplink signal can be sent on the SUL carrier or the UL carrier, and a moment at which the terminal device receives the DCI falls in the SUL available time. Therefore, the terminal device may pre-warm up a radio frequency component corresponding to the SUL carrier, and demodulate the DCI while pre-warning up the radio frequency component. When the DCI is successfully demodulated, the terminal device may lean, based on resource indication information in the DCI and the SUL available time, that an uplink signal needs to be sent on the SUL carrier. In addition, because the radio frequency component has been pre-warmed up, in this case, the radio frequency component may have been pre-warmed up or may need to be further pre-warmed up only for a relatively short time to send an uplink signal. It can be learned that after receiving the DCI, the terminal device does not need to immediately complete DCI demodulation. Instead, the terminal device may demodulate the DCI while loading a radio frequency component parameter of a corresponding carrier. When the radio frequency component is loaded or is about to be loaded, the DCI may also be demodulated or is about to be demodulated. Compared with a conventional technology in which DCI needs to be rapidly demodulated, to learn an uplink carrier on which an uplink signal is to be sent, and a radio frequency component is warmed up after the demodulation, in some embodiments, the radio frequency component is pre-warmed up, so that the radio frequency component can be used sooner after the DCI is demodulated. In addition, because the terminal device does not need to immediately complete DCI demodulation, complexity and costs of the terminal device can be reduced.

In addition, in some embodiments, the terminal device may clearly learn the time in which an uplink signal can be sent on the SUL carrier or the UL carrier. Correspondingly, the terminal device may clearly learn a time in which an uplink signal is not to be sent by using the SUL or UL carrier. Therefore, in this time, a corresponding radio frequency component may be set to sleep to reduce power consumption of the terminal. For example, as shown in (a) of FIG. 10, the terminal device learns, by using the first indication information, that the SUL carrier may be used to send an uplink signal in the SUL available time 1 in the preset period, and the SUL carrier is not used to send an uplink signal in a remaining time in the preset period. Therefore, the terminal device may set the radio frequency component corresponding to the SUL carrier to sleep, to reduce power consumption.

Figure 11:
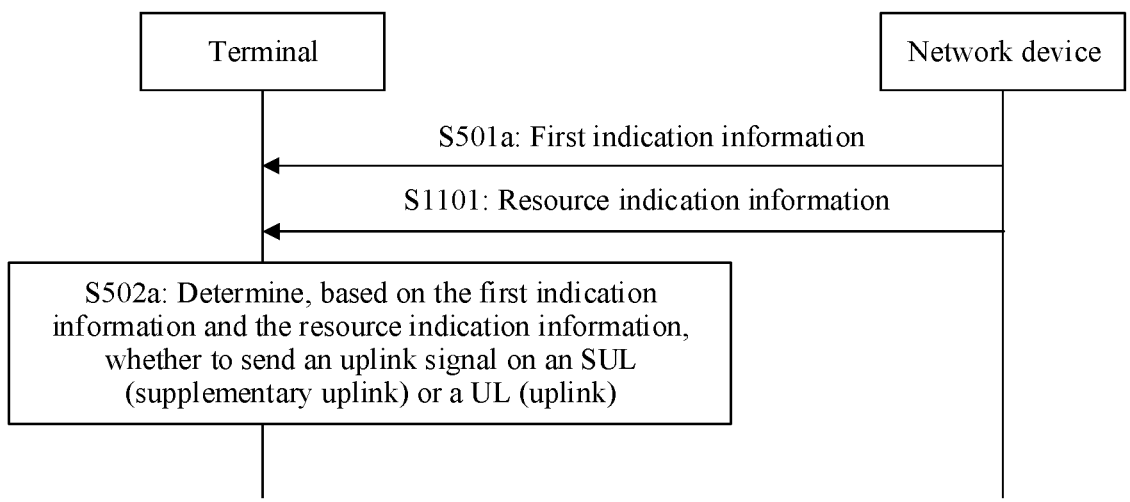
FIG. 11 and FIG. 12 are schematic flowcharts of an uplink signal sending method according to an embodiment of this application.

In some other embodiments, referring to FIG. 11, the network device may further perform the following step S1101:

S1101. The network device sends resource indication information to the terminal device.

Correspondingly, the terminal device receives the resource indication information from the network device.

The resource indication information is used to indicate a time domain resource occupied by the uplink signal.

Correspondingly, referring to FIG. 11, S502 may be implemented as follows: S502*a*. The terminal device determines, based on the first indication information and the resource indication information, whether to send the uplink signal on the SUL or the UL.

It should be noted that a sequence of performing S501*a* and S1101 is not limited to these embodiments.

In some embodiments, for different uplink signals, manners of obtaining the resource indication information by the terminal device may be different, and correspondingly, manners of determining an uplink carrier may be different. The following describes, from a perspective of different uplink signals, how to obtain resource indication information and determine an uplink carrier.

1. PUSCH and PUCCH

Figure 12:
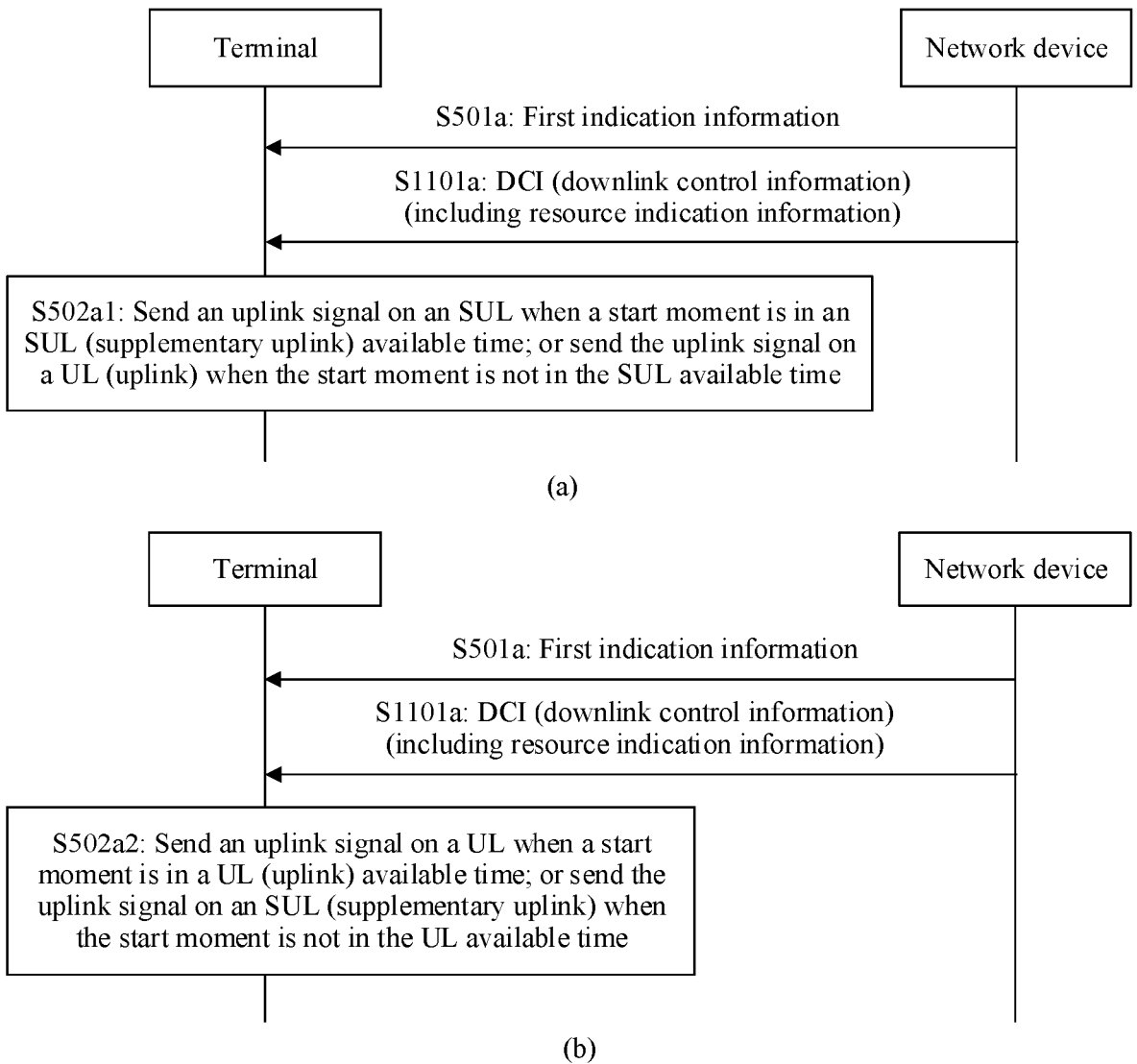
Figure 12:
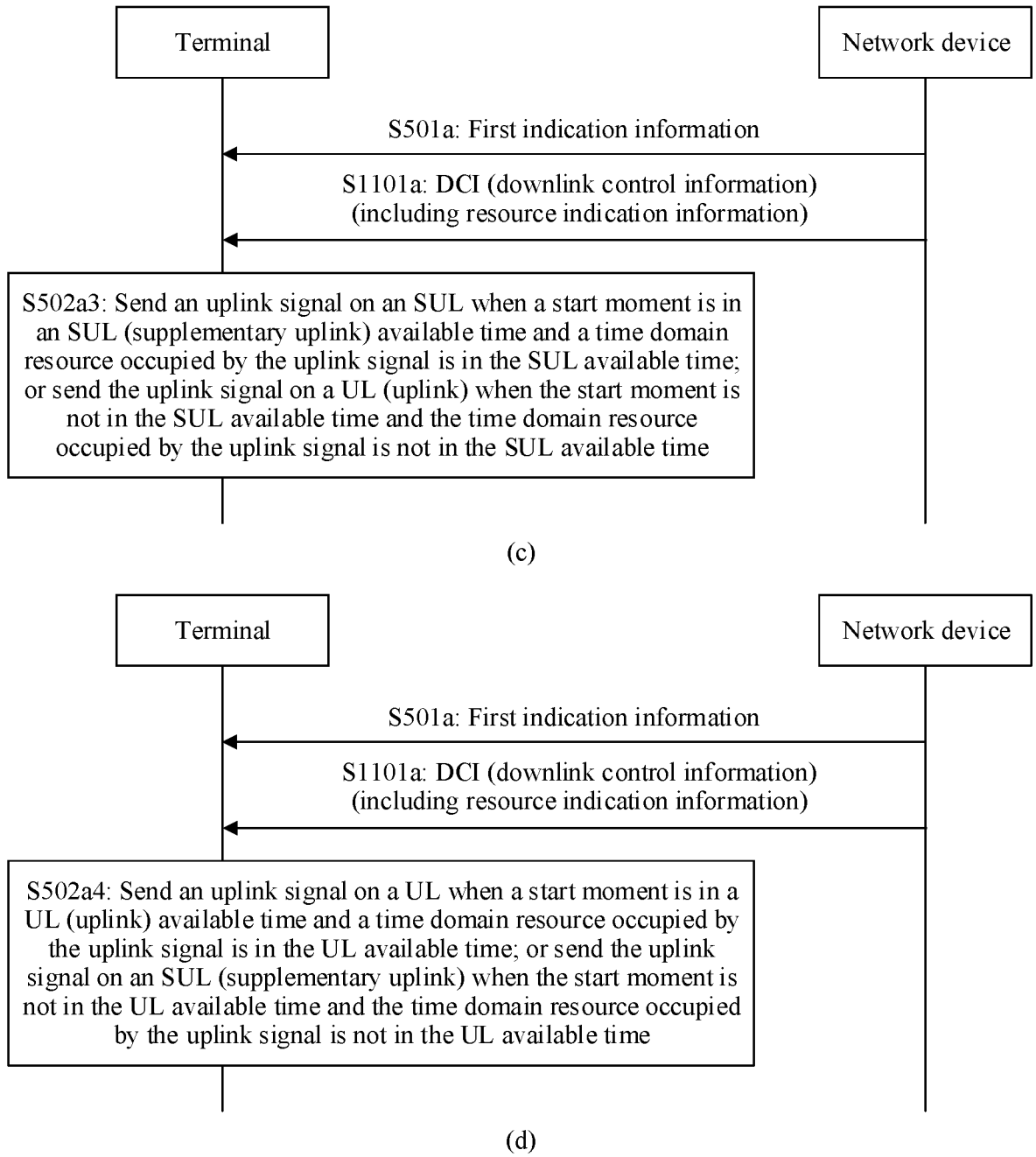

For the PUSCH and the PUCCH, the network device may dynamically schedule, by delivering DCI, the terminal device to send the PUSCH or the PUCCH. Referring to FIG. 12. S1101 may be implemented as the following step S1101*a*:

S1101*a*. The network device sends DCI to the terminal device.

Correspondingly, the terminal device receives the DCI from the network device.

The DCI includes resource indication information. The DCI is used to schedule PUSCH transmission, and the resource indication information is used to indicate a time domain resource occupied by the PUSCH. Alternatively, the DCI is used to schedule PDSCH transmission, and the resource indication information is used to indicate a time domain resource occupied by an uplink feedback corresponding to the PDSCH (the uplink feedback is carried on a PUCCH).

The PUCCH carries uplink control information (UCI), and the UCI includes hybrid automatic repeat request acknowledgment (HARQ-ACK) information, channel state information, service request information, or the like.

In a possible implementation, referring to (a) in FIG. 12, S502*a* may be implemented as the following step S502*a*1:

S502*a*1. Send the uplink signal on the SUL when a start moment is in the SUL available time; or send the uplink signal on the UL when the start moment is not in the SUL available time.

Alternatively, an uplink carrier that needs to be used may be determined based on the UL available time and the resource indication information. Referring to (b) in FIG. 12, S502*a* may be implemented as the following step: S502*a*2. Send the uplink signal on the UL when a start moment is in the UL available time; or send the uplink signal on the SUL when the start moment is not in the UL available time.

Alternatively, in some other embodiments, referring to (c) in FIG. 12, S502*a* may be implemented as the following step: S502*a*3. Send the uplink signal on the SUL when a start moment is in the SUL available time and the time domain resource occupied by the uplink signal is in the SUL available time. Send the uplink signal on the UL when the start moment is not in the SUL available time and the time domain resource occupied by the uplink signal is not in the SUL available time.

Alternatively, an uplink carrier that needs to be used may be determined based on the UL available time and the resource indication information. Referring to (d) in FIG. 12, S502*a* may be implemented as the following step: S502*a*4. Send the uplink signal on the UL when a start moment is in the UL available time and the time domain resource occupied by the uplink signal is in the UL available time; or send the uplink signal on the SUL when the start moment is not in the UL available time and the time domain resource occupied by the uplink signal is not in the UL available time.

The start moment is a start moment of the time domain resource occupied by the uplink signal, and the start moment is determined based on the resource indication information.

Figure 13A:
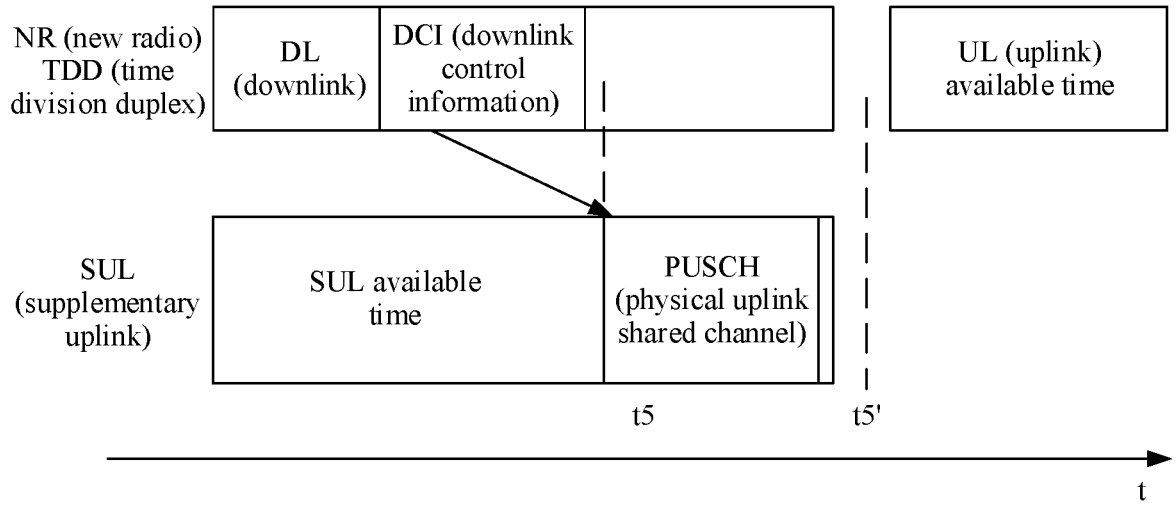
FIG. 13(a) to FIG. 15(c) are schematic diagrams of application of an uplink signal sending method according to an embodiment of this application.
Figure 13B:
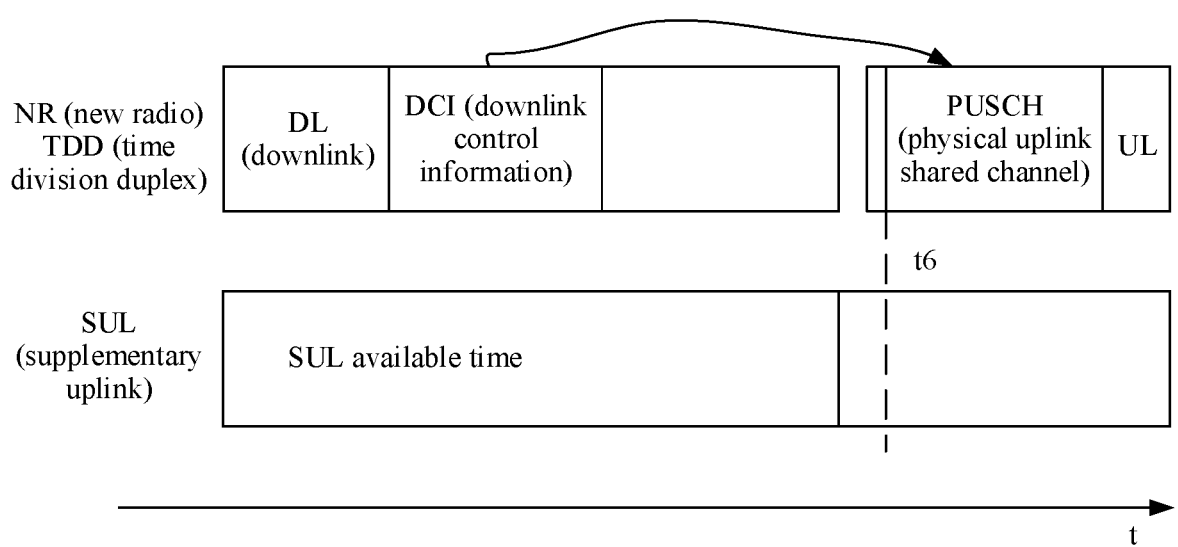

For example, the network device delivers DCI to the terminal device and schedules the terminal device to send a PUSCH. Referring to FIG. 13(*a*), the terminal device receives the DCI, and the DCI is used to schedule the PUSCH. The terminal device reads resource indication information in the DCI, and based on the resource indication information, determines a time domain resource occupied by an uplink signal on the PUSCH (or referred to as a time domain resource occupied by the PUSCH for short), and determines a start moment (that is, 5 shown in FIG. 13(a)) of the time domain resource occupied by the uplink signal on the PUSCH. As shown in FIG. 13(a), the start moment t5 of the PUSCH is in an SUL available time. Then, the terminal device transmits the PUSCH on the SUL carrier. Alternatively, as shown in FIG. 13(b), a start moment t6 of the PUSCH is not in an SUL available time. Then, the terminal device transmits the PUSCH on the UL.

In some embodiments, the network device is predefined not to perform scheduling to send an uplink signal in a time interval. The time interval refers to a time interval between the SUL available time and the UL available time. In some other embodiments, the network device may schedule an uplink signal in the time interval, but it is generally considered that this scheduled transmission is invalid. Alternatively, the terminal device performs uplink transmission on a time domain resource that is the latest after the DCI is received and that can be used for transmission. For example, as shown in FIG. 13(a), a start moment t5' of a PUSCH is in a time interval between an SUL available time and a UL available time, a possible solution is to consider that this scheduled transmission is invalid, and the terminal device may not transmit the PUSCH. In another possible solution, the terminal device performs uplink transmission on a time domain resource that is the latest after the DCI is received and that can be used for transmission, that is, transmits the PUSCH by using the UL carrier in a UL available time in FIG. 13(a).

Compared with a conventional technology in which the terminal device can send the PUCCH only on the SUL or UL carrier, in some embodiments, the terminal device may send the PUCCH by using resources of the SUL and the UL, so that resources are more fully used, and a probability of fast carrier switching is reduced, to reduce complexity and costs of the terminal device.

The start moment of the time domain resource occupied by the uplink signal may be a first symbol or a first slot of the time domain resource occupied by the uplink signal, or may be another time granularity. This is not limited to these embodiments.

Figure 13C:
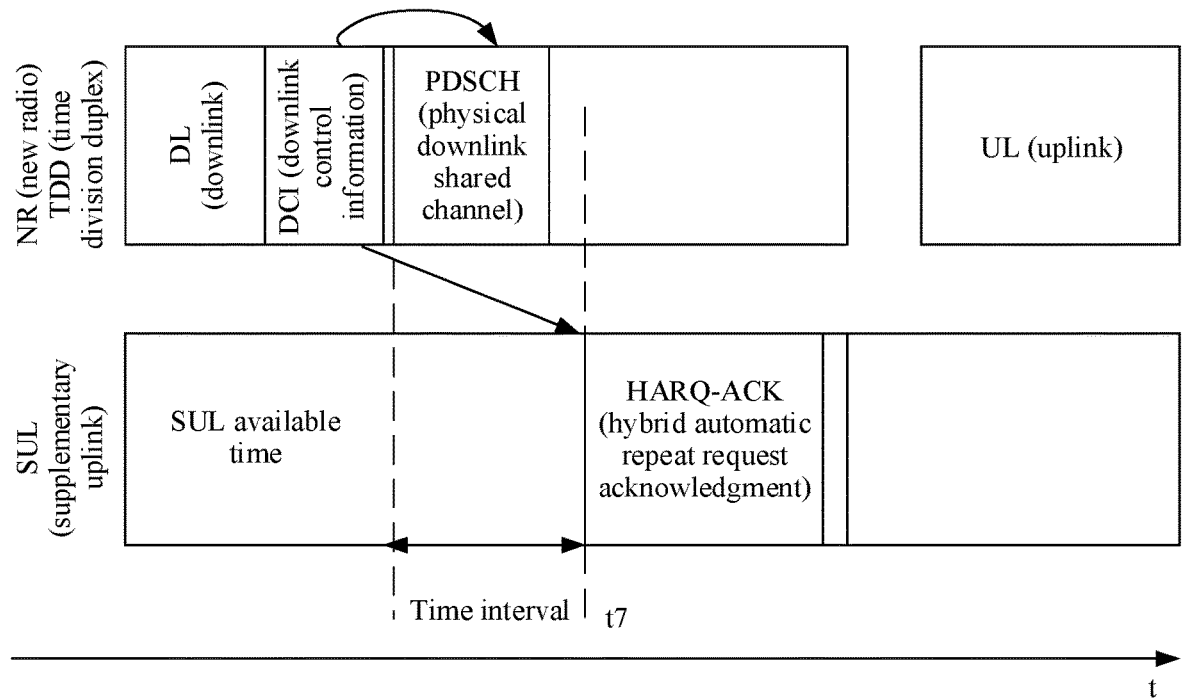
Figure 13D:
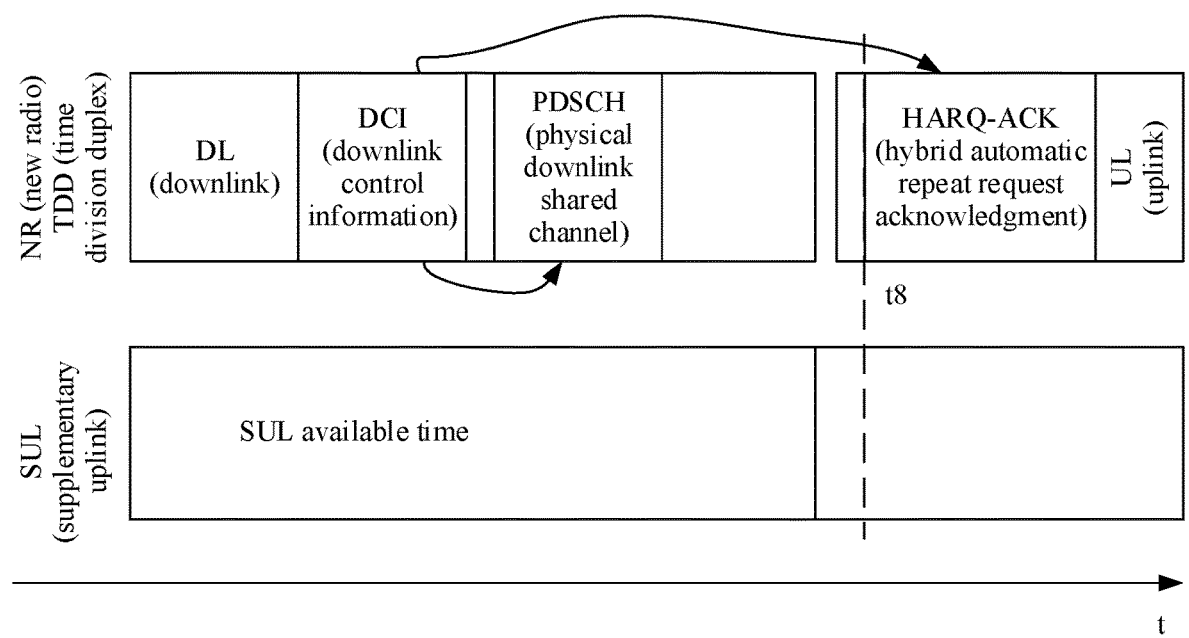

For example, the network device delivers DCI to the terminal device and schedules the terminal device to send a PDSCH, that is, PDSCH transmission is scheduled. Referring to FIG. 13(c), the network device delivers the DCI to the terminal device, to schedule the PDSCH. The terminal device receives the DCI, and receives the PDSCH based on the DCI. After receiving the PDSCH, the terminal device needs to feed back a HARQ-ACK based on whether the PDSCH is successfully received. The HARQ-ACK fed back by the terminal device is carried on a PUCCH. The DCI received by the terminal device includes information used to indicate a time domain resource occupied by the PDSCH, and the terminal receives the PDSCH in a corresponding time based on the information. The DCI further includes resource indication information, and the resource indication information is used to indicate a time domain resource occupied by an uplink feedback (that is, the HARQ-ACK) corresponding to the PDSCH. For example, a form of the resource indication information may be a PDSCH-to-HARQ feedback timing indicator (PDSCH-to-HARQ_feedback timing indicator) field. The PDSCH-to-HARQ feedback timing indicator field indicates a time interval between the HARQ-ACK and the PDSCH. In this way, based on the time domain resource of the PDSCH and the PDSCH-to-HARQ feedback timing indicator field, the terminal device may determine the time domain resource occupied by the HARQ-ACK and determine a start moment (that is, t7 shown in FIG. 13(c)) of the time domain resource occupied by the HARQ-ACK. As shown in FIG. 13(c), the start moment of the time domain resource occupied by the HARQ-ACK is t7, and t7 is in an SUL available time. Then, the terminal device sends the HARQ-ACK on the SUL carrier. As shown in FIG. 13(d), the start moment of the time domain resource occupied by the HARQ-ACK is t8, and t8 is not in an SUL available time. Then, the terminal device sends the HARQ-ACK on the UL carrier.

In some embodiments, optionally, the DCI does not include a first indication field, or in other words, a quantity of bits of the first indication field is 0. The first indication field is used to indicate whether to transmit an uplink signal on the UL or the SUL. In this way, compared with a conventional technology in which the first indication field further needs to be included in the DCI and the first indication field is used to indicate the terminal device whether to transmit the uplink signal by using the UL or the SUL, the DCI in some embodiments has smaller payload, so that DCI transmission reliability can be improved.

Optionally, the DCI includes a first indication field. Different from the conventional technology, the first indication field in some embodiments is not used to indicate the terminal device whether to transmit the uplink signal by using the UL or the SUL, but is used to indicate other information. In this way, the DCI may indicate more information without increasing DCI payload overheads, and an indication manner is more flexible. In addition, the DCI in some embodiments does not need a change in a structure of existing DCI, which changes an existing protocol little, and can be well compatible with an existing protocol standard. In another possible manner, although the DCI includes a first indication field, the terminal device does not need to read, learn, or parse the first indication field of the DCI, thereby reducing complexity of demodulating the DCI by the terminal device, and shortening a time for parsing the DCI by the terminal device.

In some other possible designs, a value of a bit in the first indication field is a predefined value, for example, 0. In a possible implementation, the first indication field may be used as a check bit, to assist the UE in determining whether the DCI is correctly demodulated, thereby improving DCI transmission reliability.

In some embodiments, the first indication field may also be referred to as a UL/SUL indication field, a carrier indication field, or another name. This is not limited to these embodiments.

In some embodiments, when the network device schedules uplink transmission by using DCI, the time domain resource occupied by the uplink signal is configured by default to be in the SUL available time or the UL available time. In this case, the terminal device may not determine whether the time domain resource occupied by the uplink signal is in the SUL available time or the UL available time, but determine an uplink carrier by only determining whether the start moment is in the SUL available time or the UL available time. Certainly, the network device may alternatively not configure, by default, the time domain resource occupied by the uplink signal to be in the SUL available time or the UL available time. For a manner of determining an uplink carrier, refer to S502a1 shown in (a) of FIG. 12, or refer to S502a2 shown in (b) of FIG. 12.

In this embodiment, for example, the network device configures, by default, the time domain resource occupied by the uplink signal to be in the SUL available time or the UL available time. For example, referring to FIG. 15(c), the network device configures the time domain resource occupied by the uplink signal to be in the UL available time. The terminal device respectively determines start moments of a PUSCH 3 and a PUSCH 4 to determine a carrier on which the PUSCH 3 and the PUSCH 4 need to be sent.

In some other embodiments, during scheduling, the network device may configure the time domain resource occupied by the uplink signal to be in the SUL available time or the UL available time, or may configure the time domain resource occupied by the uplink signal to be outside the SUL available time or the UL available time. In this case, the terminal device not only needs to determine whether the start moment of the uplink signal is in the SUL available time or the UL available time, but also needs to determine whether the time domain resource occupied by the uplink signal is in the SUL available time or the UL available time, to determine an uplink carrier. For a manner of determining an uplink carrier, refer to S502a3 shown in (c) of FIG. 12, or refer to S502a4 shown in (d) of FIG. 12.

Figure 14:
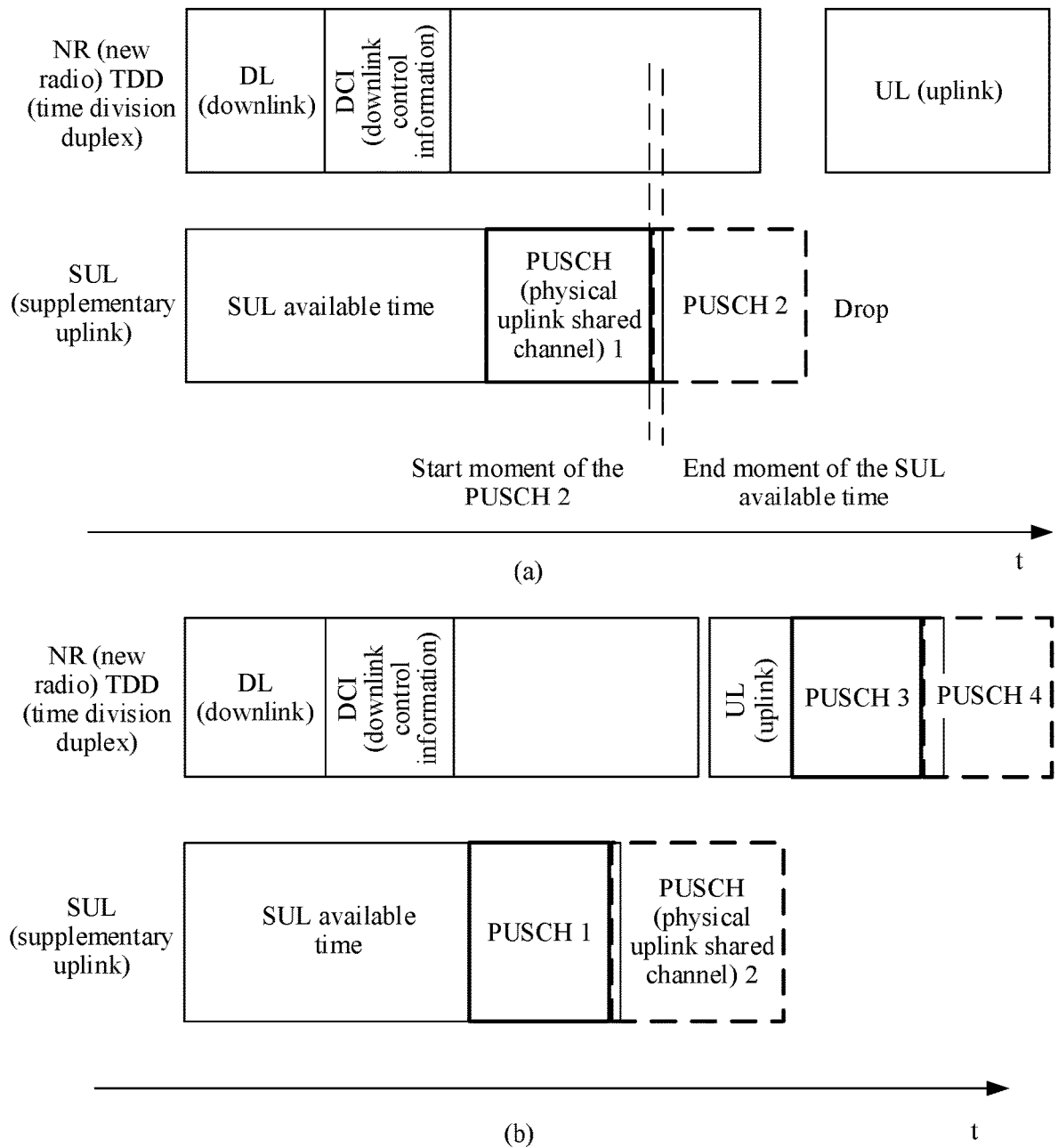

In some embodiments, in an optional design, the terminal device does not send an uplink signal beyond the range of the SUL available time, and/or does not send (or in another word, drops) an uplink signal beyond the UL available time. As shown in (a) of FIG. 14, a time domain resource occupied by a PUSCH 1 is in an SUL available time, and a start moment of the PUSCH 1 is in the SUL available time. Therefore, the terminal device sends the PUSCH 1 on the SUL carrier. A start moment of a PUSCH 2 is in the SUL available time, but a time domain resource occupied by the PUSCH 2 is beyond the SUL available time. Therefore, the terminal device does not send the PUSCH 2. As shown in (b) of FIG. 14, a time that needs to be occupied by a PUSCH 4 is beyond a UL available time, and the terminal device does not send the PUSCH 4.

Figure 15A:
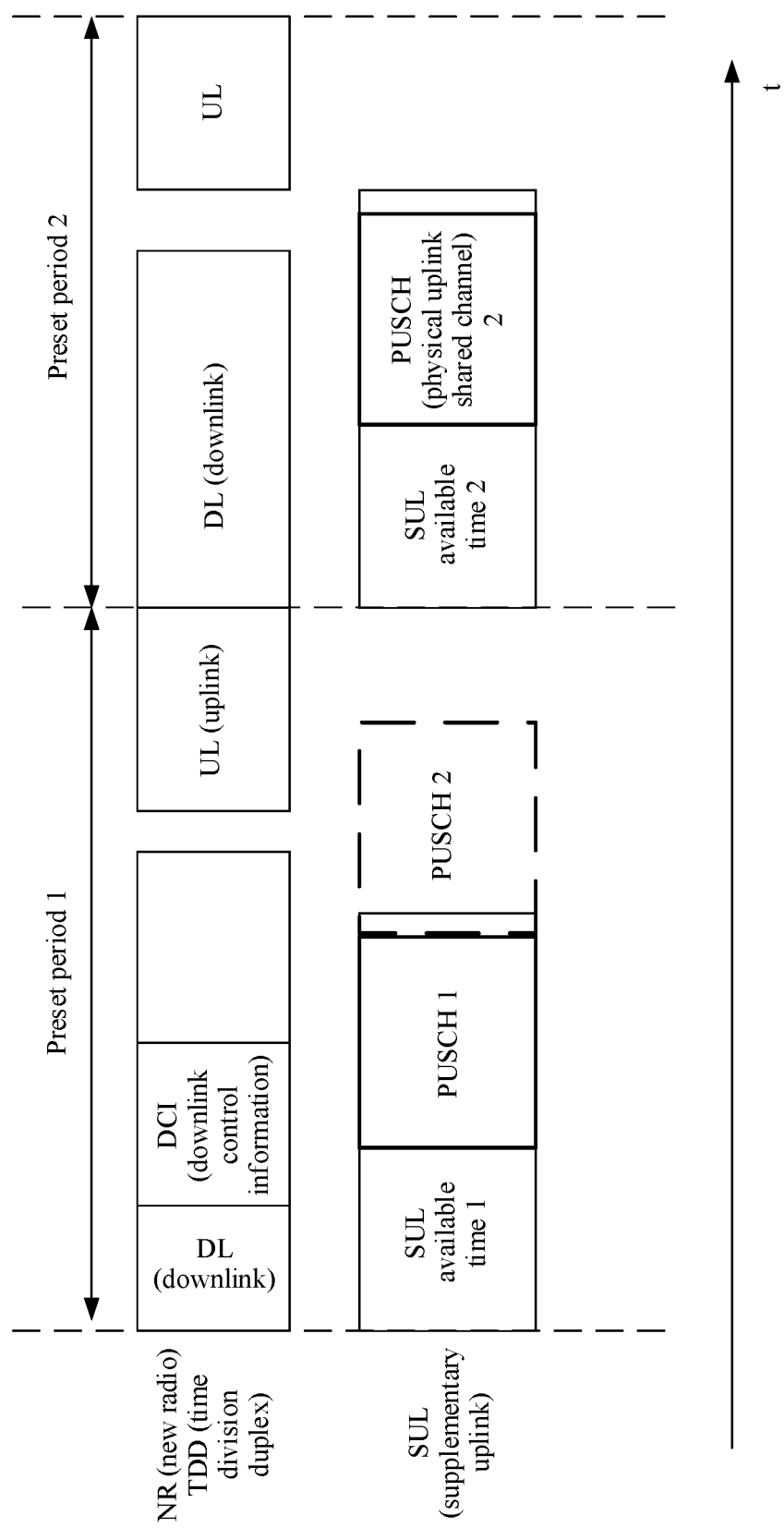
Figure 15B:
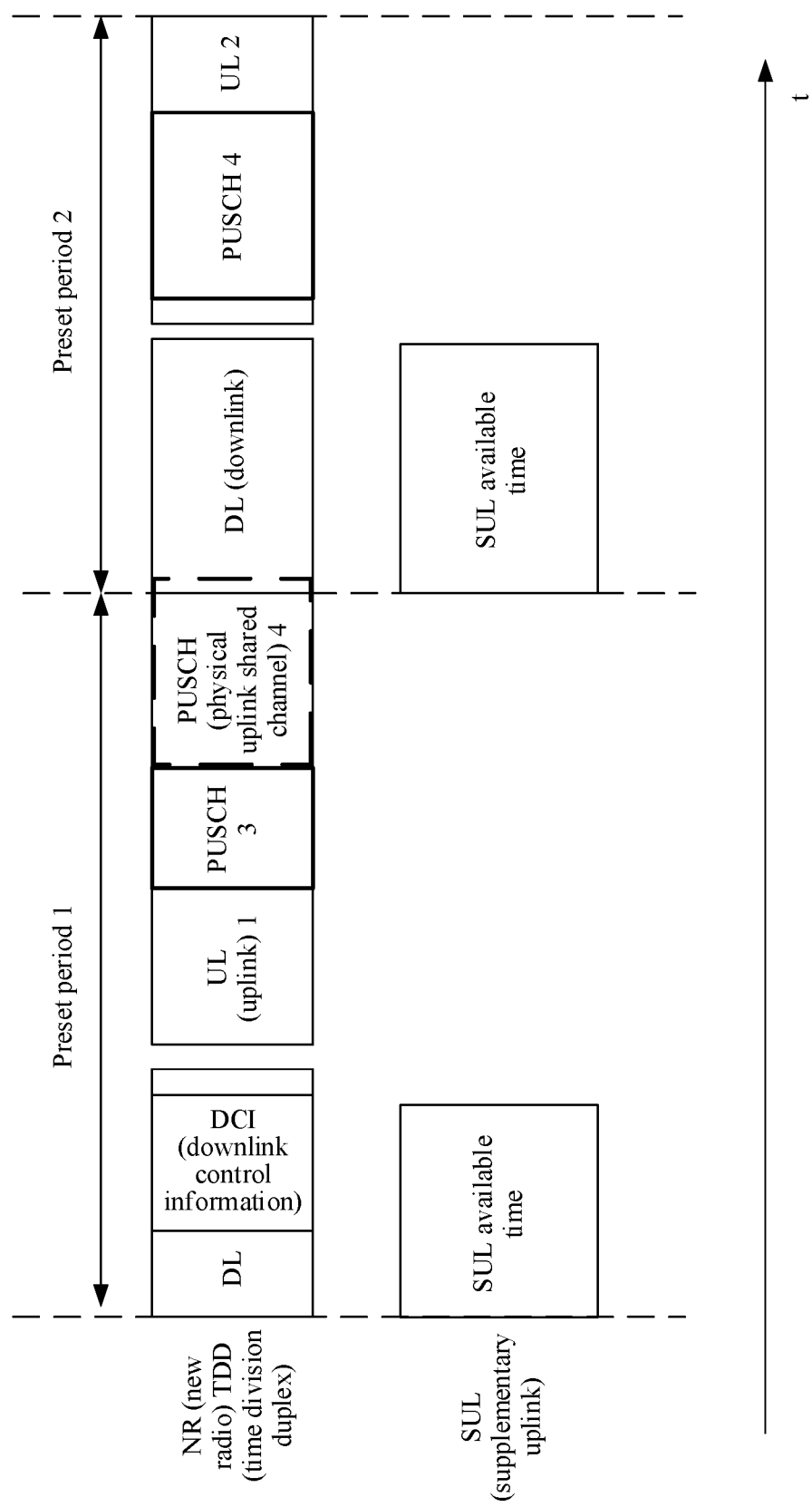
Figure 15C:
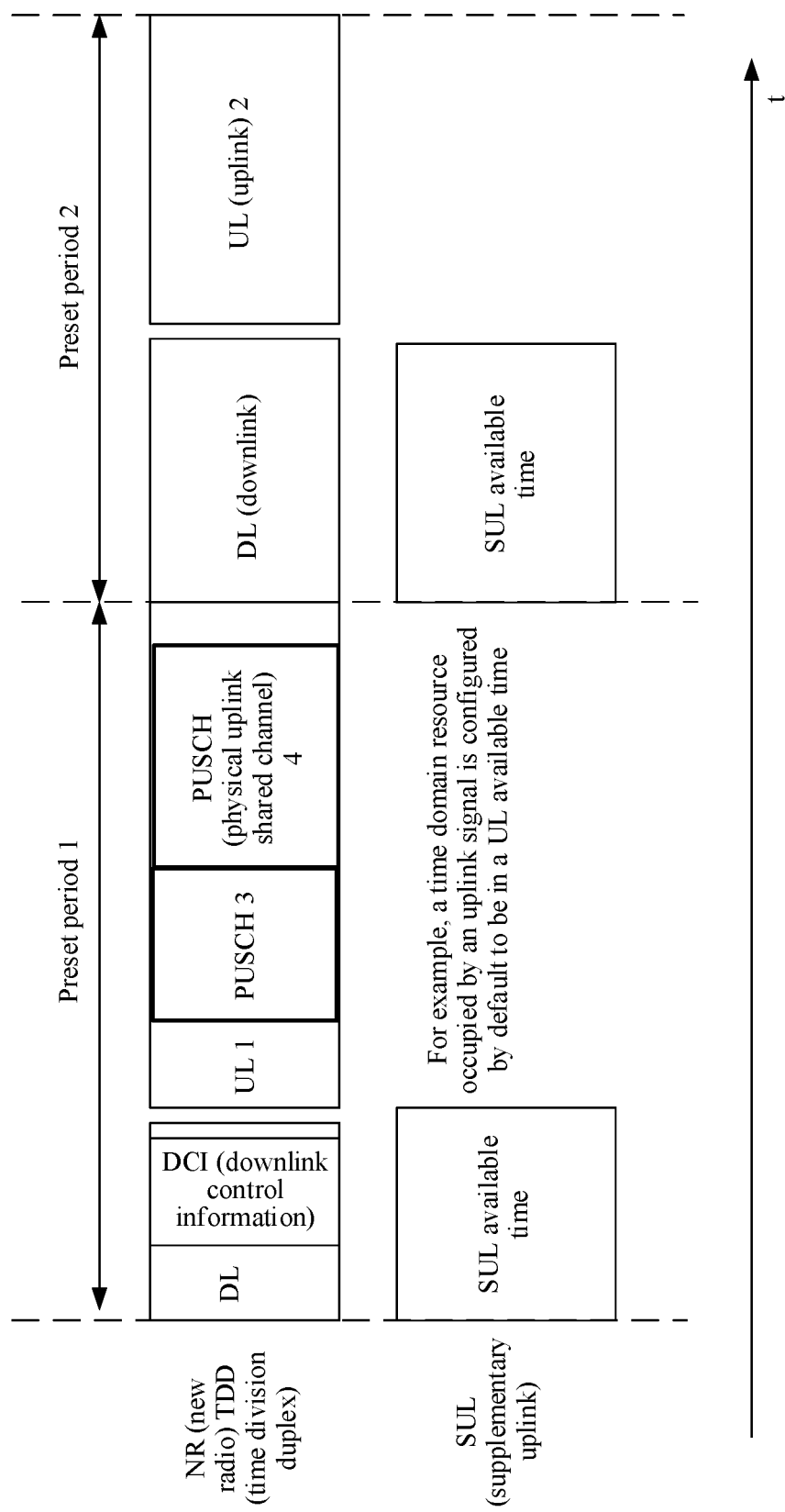

In some embodiments, in an optional design, for an uplink signal that is beyond a range of an SUL available time in a current preset period, the terminal device delays sending the uplink signal, and in a possible design, the terminal device sends the uplink signal in an SUL available time in a next preset period; and/or for an uplink signal that is beyond a UL available time, the terminal device delays sending the uplink signal, and in a possible design, the terminal device sends the uplink signal in a UL available time in a next preset period. As shown in FIG. 15(a), a time that needs to be occupied by a PUSCH 2 is beyond an SUL available time 1 in a preset period 1. Then, the terminal device sends the PUSCH 2 in an SUL available time 2 in a preset period 2. As shown in FIG. 15(b), a time that needs to be occupied by a PUSCH 4 is beyond a UL available time 1. Then, the terminal device sends the PUSCH 4 in a UL available time 2 in a preset period 2. In this way, the terminal device can delay sending a corresponding uplink signal, thereby reducing a service packet loss probability of the terminal device.

In some embodiments, in addition to dropping some uplink signals and delaying sending uplink signals, the terminal device may send an uplink signal in another manner. In the implementations corresponding to FIG. 14 and FIG. 15(a) to FIG. 15(c), the PUSCH 2 may be a repetition of the PUSCH 1, that is, a same piece of DCI schedules a same PUSCH to be repeatedly sent twice. Alternatively, the PUSCH 2 and the PUSCH 1 are different PUSCHs scheduled from different DCI, or are two PUSCHs scheduled from a same piece of DCI. This is not limited in the present disclosure. Similarly, the PUSCH 4 and the PUSCH 3 may be a same or different PUSCHs. This is not limited in the present disclosure, either.

Compared with a conventional technology in which the network device needs to indicate an uplink carrier by using the first indication field, in some embodiments, the terminal device determines an uplink carrier based on the start moment of the uplink signal and the first indication information, so that a manner of determining an uplink carrier is more flexible.

2. CG PUSCH, PUCCH, and SRS

Figure 16:
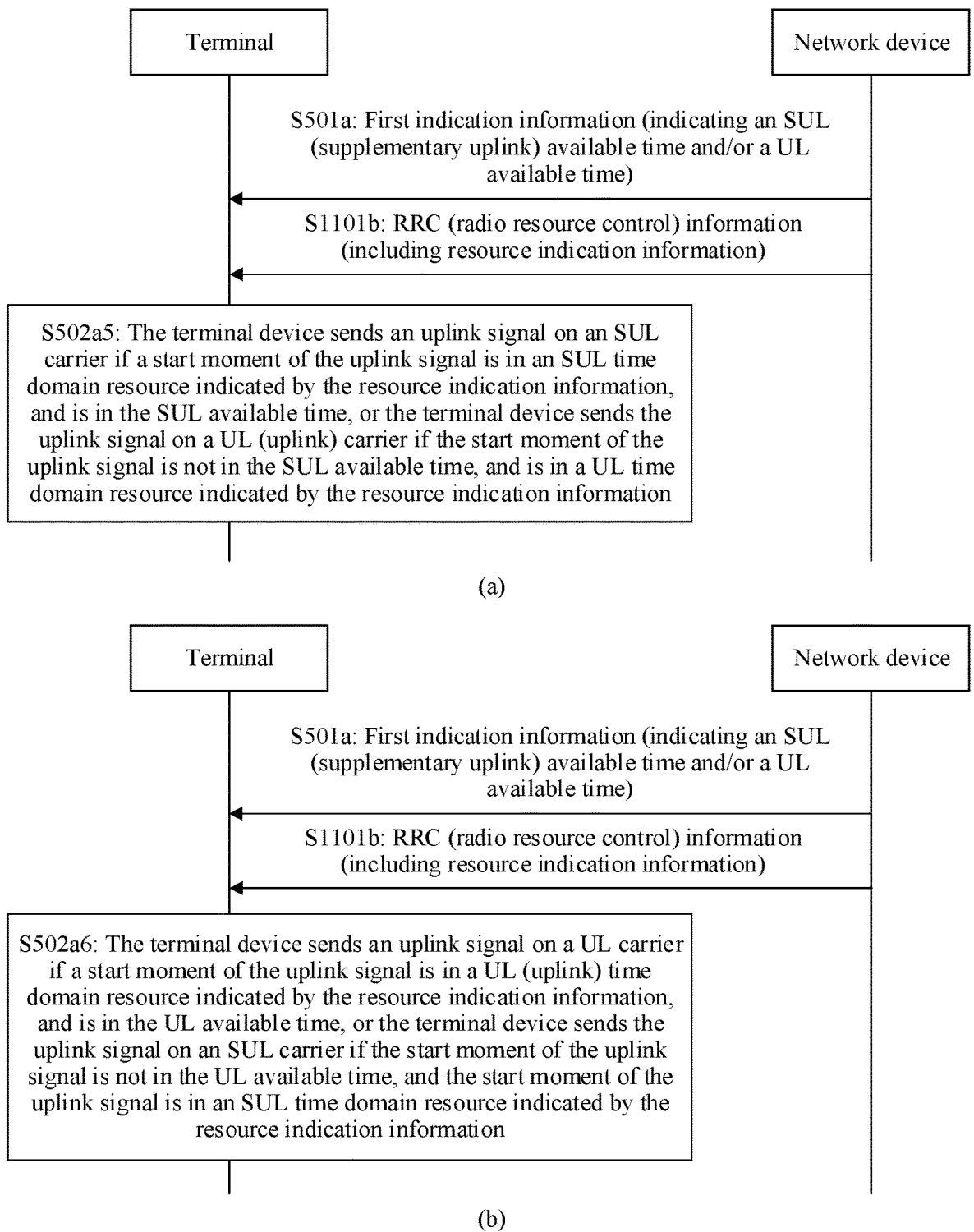
FIG. 16 is a schematic flowchart of an uplink signal sending method according to an embodiment of this application.
Figure 16:
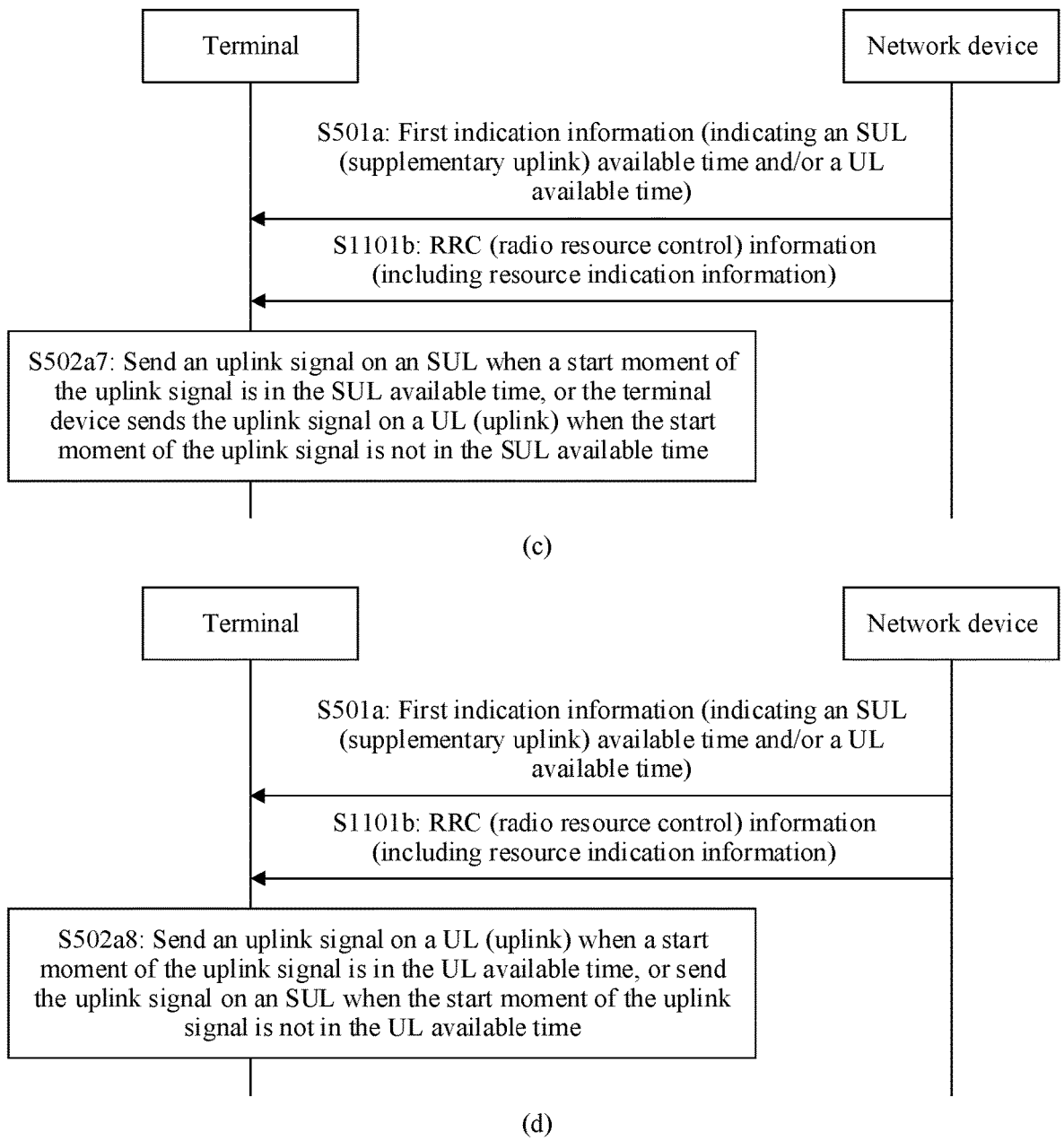

For uplink signals on the CG PUSCH and the PUCCH and the SRS, the network device may configure uplink transmission by using first RRC information. Referring to FIG. 16, S1101 may be implemented as the following step S1101b:

S1101b. The network device sends first RRC information to the terminal device.

Correspondingly, the terminal device receives the first RRC information from the network device.

The first RRC information includes resource indication information. The first RRC information is used to configure an SRS, and the resource indication information is used to indicate a time domain resource occupied by the SRS. Alternatively, the first RRC information is used to configure an uplink CG PUSCH, and the resource indication information is used to indicate a time domain resource occupied by the CG PUSCH. Alternatively, the first RRC information is used to configure a PUCCH, and the resource indication information is used to indicate a time domain resource occupied by the PUCCH.

In some embodiments, the first RRC information is used to configure one or more of the CG PUSCH, the SRS, and the PUCCH. The network device delivers first RRC information to the terminal device, and the first RRC information includes resource indication information.

In a possible design, the resource indication information configures a CG PUSCH resource only on the UL carrier or the SUL carrier for the terminal device, so that the terminal device sends the CG PUCCH only on the UL or SUL carrier; and/or the first RRC information configures an SRS resource only on the UL carrier or the SUL carrier for the terminal device, so that the terminal device sends the SRS only on the UL or SUL carrier; and/or the first RRC information configures a PUCCH resource only on the UL carrier or the SUL carrier for the terminal device, so that the terminal device sends the PUCCH only on the UL carrier or the SUL carrier.

For ease of description, a time domain resource on the SUL carrier may be referred to as an SUL time domain resource for short. A time domain resource on the UL carrier may be referred to as a UL time domain resource for short. Correspondingly, in the foregoing implementation, the resource indication information configures only an SUL time domain resource of the terminal device, so that the terminal device sends an uplink signal only by using the SUL carrier. Alternatively, the resource indication information configures only a UL time domain resource of the terminal device, so that the terminal device sends an uplink signal only by using the UL carrier.

For example, the first RRC information configures the terminal device to send an uplink signal only on the SUL carrier. The network device may include resource indication information in the first RRC information, and the resource indication information is used to indicate a related configuration on the SUL carrier. Optionally, the resource indication information indicates an SUL carrier frequency band or other SUL carrier related information. The resource indication information further indicates a time domain resource occupied by the uplink signal. In this way, the terminal device receives and parses the first RRC information, reads the resource indication information carried in the first RRC information, and learns that the terminal device can send the uplink signal only on the indicated time domain resource by using the SUL carrier in the corresponding frequency band.

In a possible implementation, the network device determines the first indication information, and determines the resource indication information based on the SUL available time and/or the UL available time indicated by the first indication information. Ff the resource indication information configures the terminal device to send the uplink signal only on the SUL carrier, the time domain resource that is occupied by the uplink signal and that is indicated by the resource indication information is the SUL available time or a part of the SUL available time. If the resource indication information configures the terminal device to send the uplink signal only on the UL carrier, the time domain resource that is occupied by the uplink signal and that is indicated by the resource indication information is the UL available time or a part of the UL available time.

For example, the PUCCH is configured. As shown in (a) of FIG. 17, the network device sends second RRC information or MAC CE signaling to the terminal device, to configure SUL available times: an SUL available time 1 and an SUL available time 2. The second RRC information or the MAC CE signaling may be further used to configure a UL available time. The network device uses a part of the SUL available time 1 and a part of the SUL available time 2 (which are indicated by bold-line boxes in (a) of FIG. 17) as time domain resources available to the PUCCH, and delivers first RRC information to the terminal device. The first RRC information carries resource indication information, and the resource indication information is used to indicate the terminal device to send the PUCCH only on the SUL carrier, and is used to indicate the time domain resources (indicated by the bold-line boxes in (a) of FIG. 17) available to the PUCCH. Subsequently, when the network device needs to switch the uplink carrier of the terminal device, the network device may further send first RRC information to the terminal device, and the first RRC information is used to reconfigure the uplink carrier of the terminal device. Specifically, the first RRC information is used to indicate the terminal device to send the PUCCH only on the UL carrier, and is further used to indicate a time domain resource occupied by the PUCCH. Herein, only the PUCCH is configured for example. Specific configuration implementation processes of the CG PUSCH and the SRS are the same as a PUCCH configuration principle, and details are not described herein.

In another possible implementation, the network device determines the resource indication information, and the resource indication information does not depend on the SUL available time and/or the UL available time. The resource indication information is used to indicate a time domain resource occupied by the uplink signal. When the resource indication information configures the terminal device to send the uplink signal only on the SUL carrier, the time domain resource occupied by the uplink signal may be the SUL available time, or may be a part of the SUL available time. Alternatively, the time domain resource occupied by the uplink signal may partially overlap the SUL available time. Alternatively, the time domain resource occupied by the uplink signal includes the SUL available time. When the resource indication information configures the terminal device to send the uplink signal only on the UL carrier, a relationship between the time domain resource occupied by the uplink signal and the UL available time may be any one of the following: the time domain resource occupied by the uplink signal is the SUL available time, the time domain resource occupied by the uplink signal is a part of the SUL available time, the time domain resource occupied by the uplink signal includes the SUL available time, or the time domain resource occupied by the uplink signal may partially overlap the SUL available time.

For example, the PUCCH is configured. The first RRC information includes resource indication information, and the resource indication information configures a time domain resource occupied by the PUCCH, as shown in (b) of FIG. 17. It can be learned that different from the resource indication information in (a) of FIG. 17 that is determined based on the SUL available time and/or the UL available time, and indicates a time domain resource that is usually a part of the SUL available time and/or the UL available time, the resource indication information in (b) of FIG. 17 indicates a time domain resource that may be a part of the SUL available time and/or the UL available time, or may be a time partially overlapping the SUL available time and/or the UL available time, or may be other cases.

In some embodiments, the resource indication information in the first RRC information configures the time domain resource occupied by the uplink signal. However, actually, the uplink signal on the configured time domain resource may be in neither the SUL available time nor the UL available time. In this case, the uplink signal is still not sent. That is, in this embodiment, the terminal device not only needs to determine whether a time domain characteristic of the uplink signal meets a time domain requirement (that is, being in the configured time domain resource) of the resource indication information, but also needs to determine whether the time domain characteristic of the uplink signal meets a time domain requirement (that is, being in the SUL available time or the UL available time) of the SUL available time or the UL available time. The terminal device determines to send the uplink signal on a carrier only when the time domain characteristic of the uplink signal meets the time domain requirement of the resource indication information and the time domain requirement of the SUL available time or the UL available time.

In some embodiments, such as referring to (a) in FIG. 16, S502a of determining based on the first indication information and the resource indication information, to send the uplink signal on the SUL or the UL may be implemented as the following step S502a5:

S502a5. The terminal device sends the uplink signal on the SUL carrier if a start moment of the uplink signal is in the SUL time domain resource indicated by the resource indication information, and is in the SUL available time. Alternatively, the terminal device sends the uplink signal on the UL carrier if the start moment of the uplink signal is not in the SUL available time, and the start moment of the uplink signal is in the UL time domain resource indicated by the resource indication information.

Alternatively, an uplink carrier that needs to be used may be determined by using the UL available time. Referring to (b) in FIG. 16. S502a may be implemented as S502a6. The terminal device sends the uplink signal on the UL carrier if a start moment of the uplink signal is in the UL time domain resource indicated by the resource indication information, and is in the UL available time. Alternatively, the terminal device sends the uplink signal on the SUL carrier if the start moment of the uplink signal is not in the UL available time, and the start moment of the uplink signal is in the SUL time domain resource indicated by the resource indication information.

In some other embodiments, different from the CG PUSCH, the PUCCH or the like on which an uplink signal on a corresponding time domain resource may not be sent even though the corresponding time domain resource is configured, in a scenario in which the network device sends an SRS to the terminal device, a feature of a periodic SRS time domain resource is that once the time domain resource is configured, the terminal device definitely periodically send the SRS on the time domain resource. Alternatively, it may be understood that the configured time domain resource is in the SUL available time or the UL available time by default.

In some embodiments, such as referring to (c) in FIG. 16, S502*a* may be implemented as follows: S502*a*7. Send the uplink signal on the SUL when a start moment of the uplink signal is in the SUL available time. Alternatively, the terminal device sends the uplink signal on the UL when the start moment of the uplink signal is not in the SUL available time.

Alternatively, the terminal device may determine, by using the UL available time, an uplink carrier that needs to be used. Referring to (d) in FIG. 16, S502*a* may be implemented as S502*a*8. Send the uplink signal on the UL when a start moment of the uplink signal is in the UL available time. Alternatively, the terminal device sends the uplink signal on the SUL when the start moment of the uplink signal is not in the UL available time.

Figure 17:
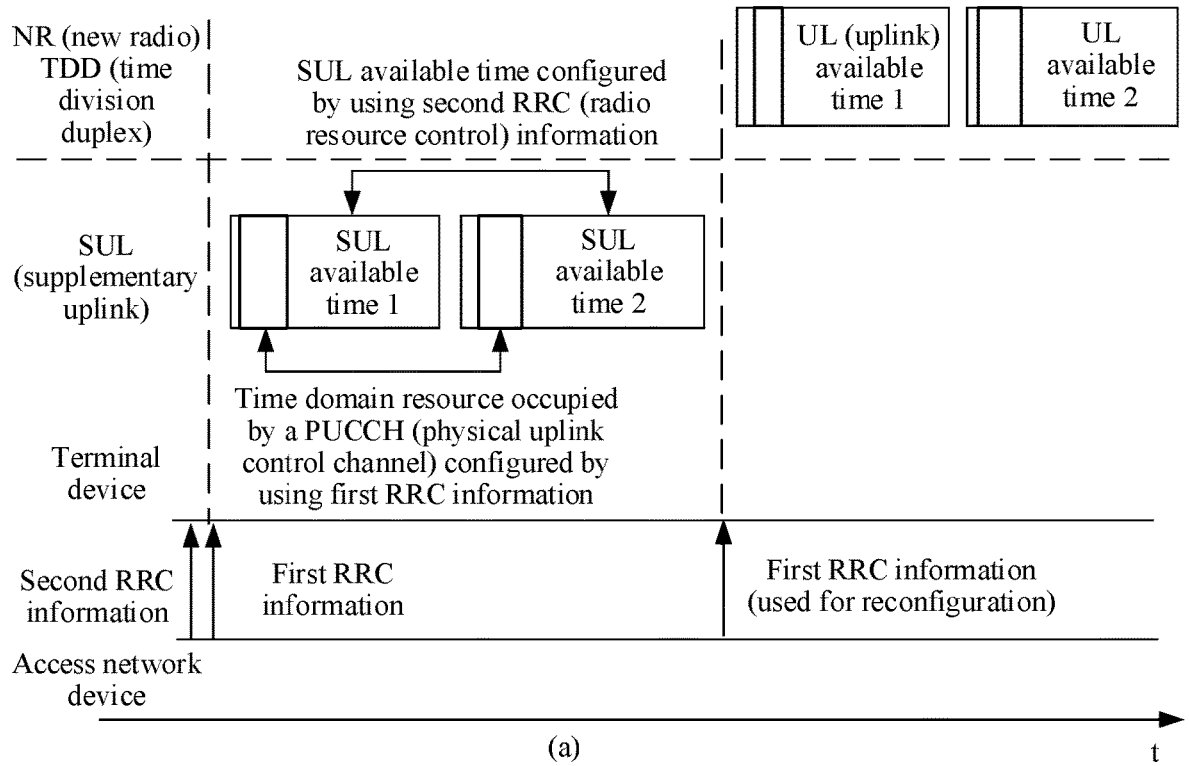
FIG. 17 is a schematic diagram of application of an uplink signal sending method according to an embodiment of this application.
Figure 17:
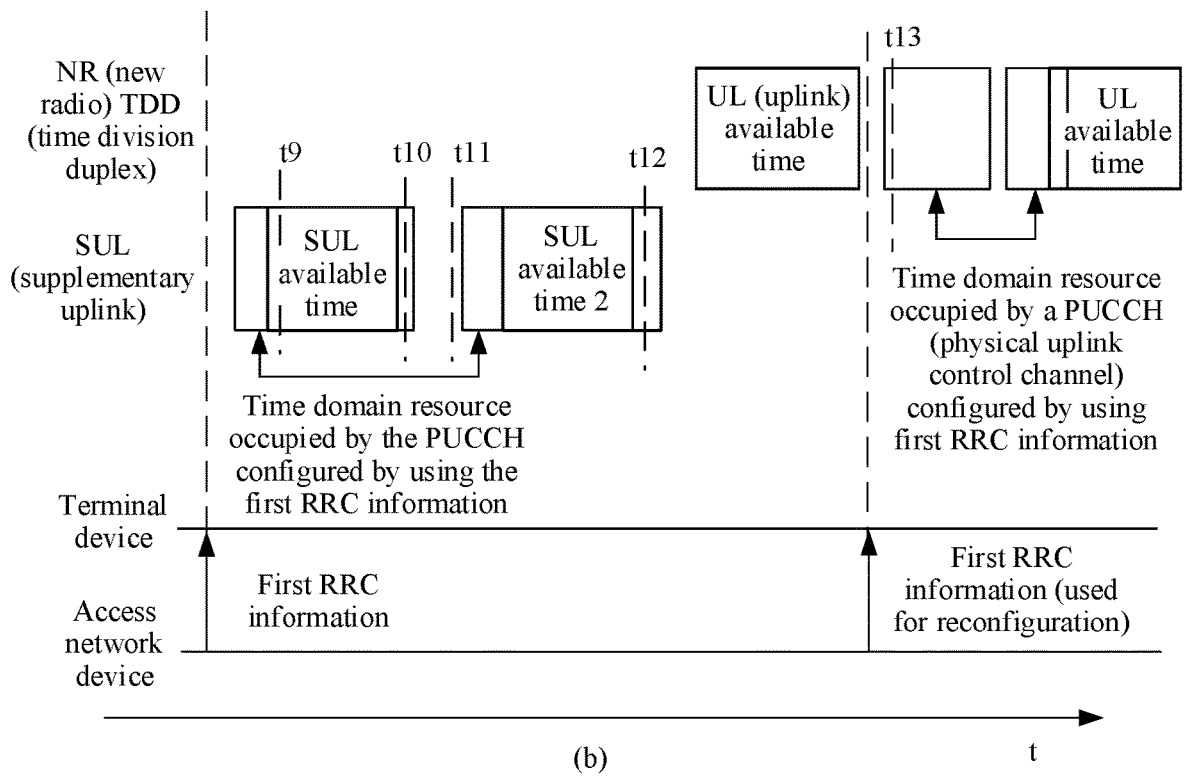
Figure 17:
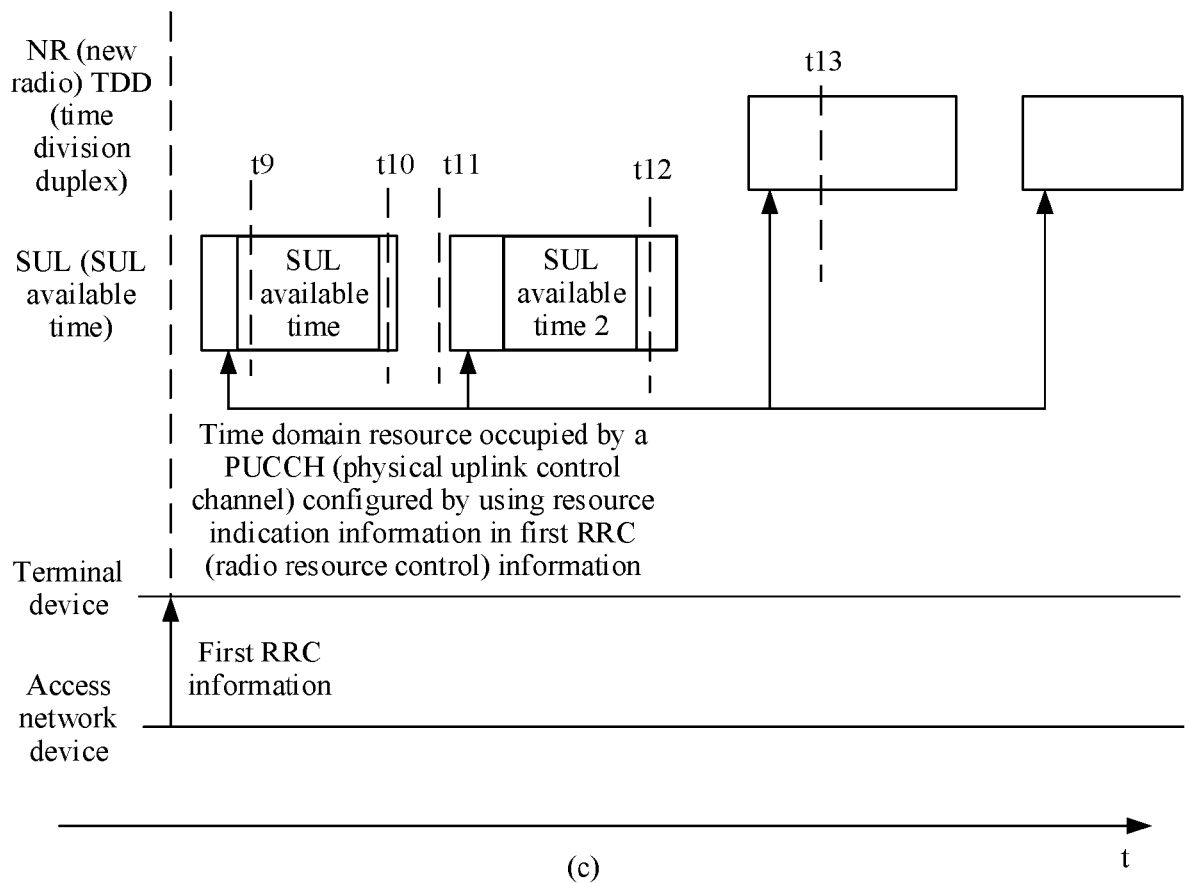

For example, referring to (b) in FIG. 17, for a PUCCH reaching at a moment t9, because the moment t9 is in an SUL available time and belongs to a time domain resource occupied by the PUCCH, the terminal device sends the PUCCH on the SUL carrier. For a PUCCH that needs to be sent at a moment t10, because t10 is not in the SUL available time, the terminal device does not send the PUCCH on the SUL carrier. Similarly, the terminal device does not send a PUCCH at a moment t11 or a moment t12 on the SUL carrier. For another example, in (b) of FIG. 17, for a PUCCH reaching at a moment t13, because t13 is not in an SUL available time, and t13 is in a UL time domain resource indicated by resource indication information, the terminal device sends the PUCCH on the UL carrier. Herein, for an implementation of sending the PUCCH on the UL carrier, refer to related descriptions of sending the PUCCH on the SUL carrier. Details are not described herein.

Different from the resource indication information configuring only an SUL time domain resource of the terminal device or configuring only a UL time domain resource, in some other embodiments, the resource indication information in the first RRC information configures an SUL time domain resource and a UL time domain resource. The resource indication information includes a time domain resource that can be used when the uplink signal (that is, the SRS/CG PUSCH/PUCCH) is sent on the UL carrier, and a time domain resource that can be used when the uplink signal is sent on the SUL carrier. The resource on the SUL carrier and the resource on the UL carrier may be different. For example, referring to (c) in FIG. 17, the resource indication information in the first RRC information configures a time domain resource that can be used to send a PUCCH on the SUL carrier, and configures a time domain resource that can be used to send a PUCCH on the UL carrier (as indicated by arrows).

In this case, for an implementation principle of S502*a* of determining, based on the first indication information and the resource indication information, to send the uplink signal on the SUL or the UL, refer to the embodiment corresponding to FIG. 16. That is, the terminal device sends the uplink signal on the SUL carrier if the start moment of the uplink signal is in the SUL time domain resource indicated by the resource indication information, and is in the SUL available time. Alternatively, the terminal device sends the uplink signal on the UL caner if the start moment of the uplink signal is not in the SUL available time, but is in the UL time domain resource indicated by the resource indication information. Alternatively, the terminal device sends the uplink signal on the UL carrier if the start moment of the uplink signal is in the UL time domain resource indicated by the resource indication information, and is in the UL available time. Alternatively, the terminal device sends the uplink signal on the SUL carrier if the start moment of the uplink signal is not in the UL available time, but the start moment of the uplink signal is in the SUL time domain resource indicated by the resource indication information. For example, referring to (c) in FIG. 17, t13 is not in an SUL available time, but in a UL time domain resource indicated by resource indication information. Then, the terminal device sends a PUCCH at the moment t13 on the UL carrier.

In some other embodiments, all the parameters in the first indication information may alternatively be predefined by using a protocol.

In this case, S501 of obtaining first indication information may be replaced with the following step: A terminal device obtains preconfigured parameters, where the preconfigured parameters include a preset period length, a duration, and a start time offset.

S502 may be replaced with the following step: The terminal device determines, based on the preconfigured parameters, whether to send an uplink signal on an SUL carrier or a UL carrier.

The uplink signal sending method in embodiments of this application is described by using only the terminal device and the network device as an example. The methods and functions implemented by the network device in the foregoing method embodiments may alternatively be implemented by using a chip that can be used in the network device, or another integrated component, part, or the like that has the foregoing functions of the network device. The methods and functions implemented by the terminal device may alternatively be implemented by using a chip that can be used in the terminal, or another integrated component, part, or the like that has the foregoing functions of the terminal device.

In embodiments of this application, function modules or function units may be obtained by dividing the communications apparatus (the communications device may be the terminal device or the network device) based on the foregoing method examples. For example, each function module or function unit may be obtained through division corresponding to each function, or two or more functions may be integrated into one processing module. The integrated module may be implemented in a form of hardware, or may be implemented in a form of a software functional module or functional unit. In embodiments of this application, module or unit division is an example, and is merely a logical function division. In actual implementation, another division manner may be used.

Figure 18:
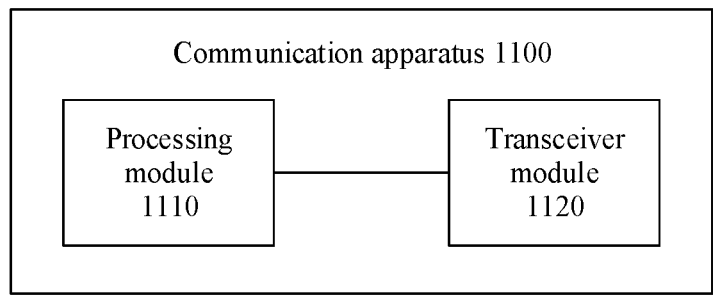
FIG. 18 and FIG. 19 are schematic diagrams of a structure of a communications apparatus according to an embodiment of this application.

FIG. 18 is a schematic block diagram of a communications apparatus 1100 according to an embodiment of this application. The communications apparatus 1100 includes a processing module 1110. Optionally, a transceiver module 1120 may be further included.

For example, the communications apparatus 1100 may be the terminal device, or may be a chip applied to the terminal device, or another integrated component, part, or the like that has a function of the terminal device. Alternatively, the communications apparatus 1100 may be the network device, or may be a chip applied to the network device, or another integrated component, part, or the like that has a function of the network device.

When the communications apparatus 1100 is the terminal device or the network device, the transceiver module 1120 may be a transceiver, the transceiver may include an antenna, a radio frequency circuit, and the like, and the processing module 1110 may be a processor (or a processing circuit), for example, a baseband processor. The baseband processor may include one or more CPUs.

When the communications apparatus 1100 is a component that has a function of the terminal device or a function of the network device, the transceiver module 1120 may be a radio frequency unit, and the processing module 1110 may be a processor (or a processing circuit), for example, a baseband processor.

When the communications apparatus 1100 is a chip system, the transceiver module 1120 may be an input/output interface of a chip (for example, a baseband chip), and the processing module 1110 may be a processor (or a processing circuit) of the chip system, and may include one or more central processing units. It should be understood that, the processing module 1110 in some embodiments may be implemented by a processor or a processor-related circuit component (or referred to as a processing circuit), and the transceiver module 1120 may be implemented by a transceiver or a transceiver-related circuit component.

For example, the communications apparatus 1100 is configured to implement a function of the terminal device. The processing module 1110 may be configured to perform all operations except receiving and sending operations in the embodiment shown in FIG. 6, FIG. 11, FIG. 12, or FIG. 16, for example, perform S502 shown in FIG. 6, S502a shown in FIG. 11, S502a1, S502a2, S502a3, and S502a4 shown in FIG. 12, and S502a5, S502a6, S502a7, and S502a8 shown in FIG. 16, read a preconfigured parameter, and/or other steps in embodiments of this application. The transceiver module 1120 may be configured to perform S501a shown in FIG. 6. S1101 shown in FIG. 11, S1101a shown in FIG. 12, S1101b shown in FIG. 16, and/or other steps in embodiments of this application.

The transceiver module 1120 is configured to obtain first indication information. The first indication information is used to indicate a SUL available time, and the SUL available time is a time in which an uplink signal can be sent on an SUL carrier in a preset period.

The processing module 1110 is configured to determine, based on the first indication information, whether to send an uplink signal on an SUL or a UL.

In an optional implementation, the SUL available time does not overlap a UL available time, and the UL available time is a time in which an uplink signal can be sent on a UL carrier.

In an optional implementation, a time interval between the SUL available time and the UL available time is greater than or equal to a preset threshold.

In an optional implementation, the first indication information includes one or more of a time length of the preset period, a start time offset, and a duration.

The start time offset is an offset value between a start moment of an SUL available time in one preset period and a start moment of the preset period. The duration is a duration of an SUL available time in one preset period.

In an optional implementation, the processing module 1110 being configured to determine, based on the first indication information, whether to send an uplink signal on an SUL or a UL includes: the processing module 1110 is configured to determine, based on the first indication information and resource indication information, whether to send the uplink signal on the SUL or the UL, where the resource indication information is used to indicate a time domain resource occupied by the uplink signal.

In an optional implementation, the processing module 1110 being configured to determine, based on the first indication information and resource indication information, whether to send the uplink signal on the SUL or the UL includes: the processing module 1110 is configured to send the uplink signal on the SUL when a start moment is in the SUL available time; send the uplink signal on the UL when the start moment is not in the SUL available time; or send the uplink signal on the SUL when the start moment is in the SUL available time and the time domain resource occupied by the uplink signal is in the SUL available time; or send the uplink signal on the UL when the start moment is not in the SUL available time and the time domain resource occupied by the uplink signal is not in the SUL available time.

The start moment is a start moment of the time domain resource occupied by the uplink signal, and the start moment is determined based on the resource indication information.

In an optional implementation, the transceiver module 1120 is further configured to receive DCI, where the DCI includes the resource indication information.

The DCI is used to schedule PUSCH transmission, and the resource indication information is used to indicate a time domain resource occupied by the PUSCH.

Alternatively, the DCI is used to schedule PDSCH transmission, and the resource indication information is used to indicate a time domain resource occupied by an uplink feedback corresponding to the PDSCH.

In an optional implementation, the DCI does not include a first indication field, or a quantity of bits of the first indication field is 0. The first indication field is used to indicate whether to transmit an uplink signal on the UL or the SUL.

Figure 6:
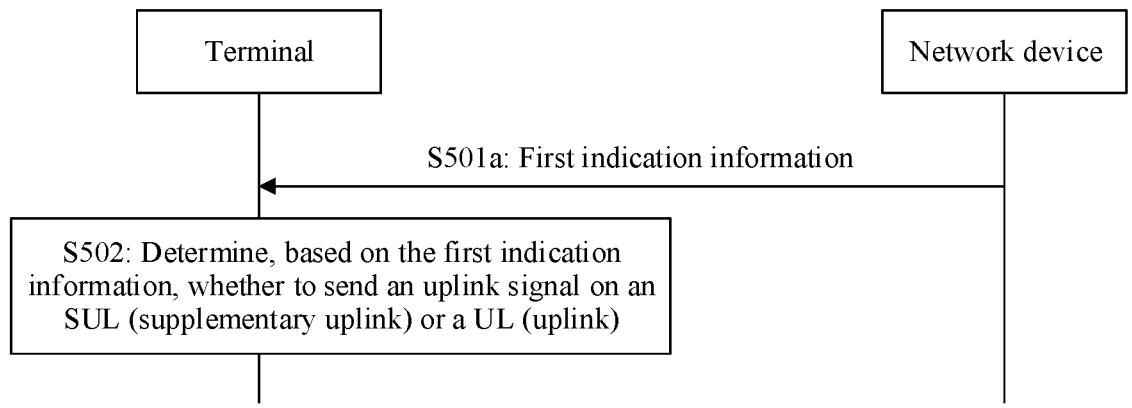

For other functions that can be implemented by the communications apparatus 1100, refer to related descriptions of the embodiment shown in FIG. 6 or another embodiment shown FIG. 5, FIG. 11, FIG. 12, FIG. 16, or the like. Details are not described.

For example, the communications apparatus 1100 is configured to implement a function of the network device. The processing module 1110 may be configured to perform all operations except receiving and sending operations in the embodiment shown in FIG. 6, FIG. 11, FIG. 12, or FIG. 16, for example, determine first indication information and resource indication information, and/or other steps in embodiments of this application. The transceiver module 1120 may be configured to perform S501a shown in FIG. 6, S1101 shown in FIG. 11, S1101a shown in FIG. 12, S1101b shown in FIG. 16, and/or other steps in embodiments of this application.

The processing module 1110 is configured to determine first indication information. The first indication information is used to indicate a SUL available time, and the SUL available time is a time in which an uplink signal can be sent on an SUL carrier in a preset period.

The transceiver module 1120 is configured to send the first indication information to a terminal device.

In an optional implementation, the SUL available time does not overlap a UL available time, and the UL available time is a time in which an uplink signal can be sent on a UL carrier.

In an optional implementation, a time interval between the SUL available time and the UL available time is greater than or equal to a preset threshold.

In an optional implementation, the first indication information includes one or more of a time length of the preset period, a start time offset, and a duration.

The start time offset is an offset value between a start moment of an SUL available time in one preset period and a start moment of the preset period. The duration is a duration of an SUL available time in one preset period.

In an optional implementation, the transceiver module 1120 is further configured to send DCI to the terminal device, where the DCI includes resource indication information.

The DCI is used to schedule PUSCH transmission, and the resource indication information is used to indicate a time domain resource occupied by the PUSCH. Alternatively, the DCI is used to schedule PDSCH transmission, and the resource indication information is used to indicate a time domain resource occupied by an uplink feedback corresponding to the PDSCH.

In an optional implementation, the DCI does not include a first indication field, or a quantity of bits of the first indication field is 0. The first indication field is used to indicate whether to transmit an uplink signal on the UL or the SUL.

All related content of the steps in the foregoing method embodiment may be cited in function descriptions of corresponding function modules in the apparatus shown in FIG. 18. Details are not described herein again.

Figure 19:
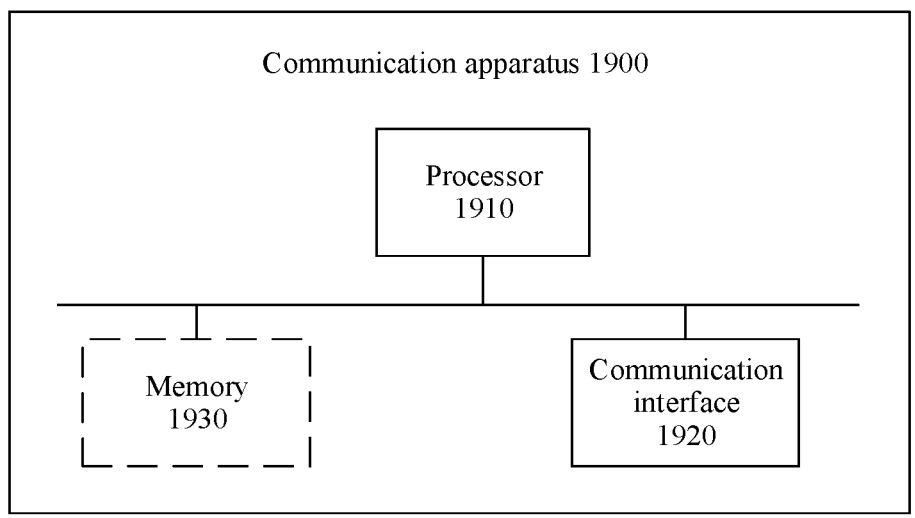

FIG. 19 is a schematic diagram of another communications apparatus according to an embodiment of this application. The communications apparatus is configured to implement an operation of the terminal device or the network device in the foregoing embodiment. The communications apparatus 1900 includes a processor 1910 and a communications interface 1920. Optionally, the communications apparatus further includes a memory 1930. The communications interface 1920 is configured to implement communication with another device.

In the foregoing embodiment, the method performed by the terminal device may be implemented by the processor 1910 by invoking a program stored in a memory (which may be a memory of the terminal device or the network device, or an external memory). That is, an apparatus (referred to as a communications apparatus in some embodiments) configured to implement a function of the terminal device may include the processor 1910, and the processor 1910 invokes the program in the memory to perform the method performed by the terminal device in the foregoing method embodiments. The method performed by the network device may be implemented by the processor 1910 by invoking a program stored in a memory (which may be a memory of the terminal device or the network device, or an external memory). That is, an apparatus (referred to as a communications apparatus in some embodiments) configured to implement a function of the network device may include the processor 1910, and the processor 1910 invokes the program in the memory to perform the method performed by the network device in the foregoing method embodiments.

The processor herein may be an integrated circuit having a signal processing capability, for example, a central processing unit (CPU). The apparatus configured to implement the function of the terminal device or the network device may be implemented by using one or more integrated circuits configured to implement the foregoing method, for example, one or more application-specific integrated circuits (ASIC), one or more digital signal processors (DSP), one or more field programmable gate arrays (FPGA), or a combination of at least two of these integrated circuit forms. Alternatively, the foregoing implementations may be combined.

For example, a function/implementation process of the processing module 1110 in FIG. 18 may be implemented by the processor 1910 in the communications apparatus 1900 shown in FIG. 19 by invoking computer execution instructions stored in the memory 1930, and a function/implementation process of the transceiver module 1120 in FIG. 18 may be implemented by using the communications interface 1920 in the communications apparatus 1900 shown in FIG. 19.

Because the network device, the components in the network device, the terminal device, and the components in the terminal device that are provided in embodiments of this application may perform the foregoing uplink signal sending method, for technical effects that can be achieved by them, refer to the foregoing method embodiments. Details are not described herein again.

An embodiment of this application further provides a computer-readable storage medium. The computer-readable storage medium stores instructions. When the instructions are executed, steps performed by the terminal device or the network device in the method procedure shown in the foregoing method embodiment are performed.

The computer-readable storage medium may be, for example but not limited to, an electronic, magnetic, optical, electromagnetic, infrared, or semiconductor system, apparatus, or component, or any combination thereof. More specific examples (e.g., a non-exhaustive list) of the computer-readable storage medium include an electrical connection having one or more wires, a portable computer disk, a hard disk, a random access memory (RAM), a read-only memory (ROM), an erasable programmable read-only memory (EPROM), a register, an optical fiber, a portable compact disk read-only memory (CD-ROM), an optical storage component, a magnetic storage component, any suitable combination thereof, or a computer-readable storage medium in any other form well known in the art. For example, a storage medium is coupled to a processor, so that the processor can read information from the storage medium and write information into the storage medium. Certainly, the storage medium may be a component of the processor. The processor and the storage medium may be located in an application-specific integrated circuit (ASIC). In some embodiments, the computer-readable storage medium may be any tangible medium including or storing a program, and the program can be used by or used in combination with an instruction execution system, apparatus, or component.

Optionally, an embodiment of this application further provides a chip system, applied to a terminal device. The chip system includes a processor, configured to support the terminal device in implementing the foregoing uplink signal sending method. In a possible design, the chip system further includes a memory. The memory is configured to store program instructions and data that are necessary to the terminal. Certainly, alternatively, the memory may not be in the chip system. The chip system may include a chip, or may include a chip and another discrete device. This is not specifically limited to these embodiments.

An embodiment of this application further provides another chip system, applied to a network device. The chip system includes a processor, configured to support the network device in implementing the foregoing uplink signal sending method. In a possible design, the chip system further includes a memory. The memory is configured to store program instructions and data that are necessary to the network device. Certainly, alternatively, the memory may not be in the chip system. The chip system may include a chip, or may include a chip and another discrete device. This is not specifically limited to these embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink signal sending method, comprising:
   obtaining first indication information, wherein the first indication information indicates a supplementary uplink (SUL) available time, the SUL available time being a time in which an uplink signal is capable of being sent on an SUL carrier in a preset period; and
   determining, based on the first indication information and the SUL available time, whether to send an uplink signal on an SUL or an uplink (UL).

2. The uplink signal sending method according to claim 1, wherein the SUL available time does not overlap a UL available time, the UL available time being a time in which an uplink signal is capable of being sent on a UL carrier.

3. The uplink signal sending method according to claim 2, wherein a time interval between the SUL available time and the UL available time is greater than or equal to a preset threshold.

4. The uplink signal sending method according to claim 1, wherein:
   the first indication information comprises one or more of a time length of the preset period, a start time offset, and a duration,
   the start time offset is an offset value between a start moment of the SUL available time in one preset period and a start moment of the preset period; and
   the duration is a duration of the SUL available time in one preset period.

5. The uplink signal sending method according to claim 1, wherein the determining, based on the first indication information, whether to send the uplink signal on the SUL or send the uplink signal on the UL comprises:
   determining, based on the first indication information and resource indication information, whether to send the uplink information on the SUL or the UL, wherein the resource indication information is used to indicate a time domain resource occupied by the uplink signal.

6. An uplink signal sending method, comprising:
   determining first indication information, wherein the first indication information indicates a supplementary uplink (SUL) available time, the SUL available time being a time in which an uplink signal is capable of being sent on an SUL carrier in a preset period; and
   sending the first indication information to a terminal device.

7. The uplink signal sending method according to claim 6, wherein the SUL available time does not overlap a UL available time, the UL available time being a time in which an uplink signal is capable of being sent on a UL carrier.

8. The uplink signal sending method according to claim 7, wherein a time interval between the SUL available time and the UL available time is greater than or equal to a preset threshold.

9. The uplink signal sending method according to claim 6, wherein:
   the first indication information comprises one or more of a time length of the preset period, a start time offset, and a duration,
   the start time offset is an offset value between a start moment of the SUL available time in one preset period and a start moment of the preset period; and
   the duration is a duration of the SUL available time in one preset period.

10. The uplink signal sending method according to claim 6, wherein the method further comprises:
    sending downlink control information (DCI) to the terminal device, wherein the DCI comprises resource indication information; and
    the DCI is used to schedule physical uplink shared channel (PUSCH) transmission, and the resource indication information is used to indicate a time domain resource occupied by the PUSCH; or
    the DCI is used to schedule physical downlink shared channel (PDSCH) transmission, and the resource indication information is used to indicate a time domain resource occupied by an uplink feedback corresponding to the PDSCH, wherein the DCI does not comprise a first indication field, or a quantity of bits of the first indication field is 0, wherein the first indication field is used to indicate whether to transmit an uplink signal on an uplink (UL) or an SUL.

11. A communication apparatus, comprising one or more processors; and
    a computer-readable storage medium storing a program to be executed by the one or more processors, the program including instructions to:
    obtain first indication information, wherein the first indication information is used to indicate a supplementary uplink (SUL) available time, the SUL available time being a time in which an uplink signal is capable of being sent on an SUL carrier in a preset period; and
    determine, based on the first indication information and the SUL available time, whether to send an uplink signal on an SUL or an uplink (UL).

12. The communication apparatus according to claim 11, wherein the SUL available time does not overlap a UL available time, the UL available time being a time in which an uplink signal is capable of being sent on a UL carrier.

13. The communication apparatus according to claim 12, wherein a time interval between the SUL available time and the UL available time is greater than or equal to a preset threshold.

14. The communication apparatus according to claim 11, wherein:
    the first indication information comprises one or more of a time length of the preset period, a start time offset, and a duration,
    the start time offset is an offset value between a start moment of the SUL available time in one preset period and a start moment of the preset period; and
    the duration is a duration of the SUL available time in one preset period.

15. The communication apparatus according to claim 11, wherein the processing module being configured to determine, based on the first indication information, whether to send the uplink signal on the SUL or send the uplink signal on the UL comprises:

the processing module being configured to determine, based on the first indication information and resource indication information, whether to send the uplink information on the SUL or the UL, wherein the resource indication information is used to indicate a time domain resource occupied by the uplink signal.

16. A communication apparatus, comprising one or more processors; and a computer-readable storage medium storing a program to be executed by the one or more processors, the program including instructions to:

determine first indication information, wherein the first indication information indicates a supplementary uplink (SUL) available time, the SUL available time being a time in which an uplink signal is capable of being sent on an SUL carrier in a preset period; and send the first indication information to a terminal device.

17. The communication apparatus according to claim 16, wherein the SUL available time does not overlap a UL available time, the UL available time being a time in which an uplink signal is capable of being sent on a UL carrier.

18. The communication apparatus according to claim 17, wherein a time interval between the SUL available time and the UL available time is greater than or equal to a preset threshold.

19. The communication apparatus according to claim 16, wherein:

the first indication information comprises one or more of a time length of the preset period, a start time offset, and a duration, the start time offset is an offset value between a start moment of the SUL available time in one preset period and a start moment of the preset period; and the duration is a duration of the SUL available time in one preset period.

20. The communication apparatus according to claim 16, wherein the transceiver module is further configured to send downlink control information (DCI) to the terminal device, wherein the DCI comprises resource indication information; and the DCI is used to schedule physical uplink shared channel (PUSCH) transmission, and the resource indication information is used to indicate a time domain resource occupied by the PUSCH; or the DCI is used to schedule physical downlink shared channel (PDSCH) transmission, and the resource indication information is used to indicate a time domain resource occupied by an uplink feedback corresponding to the PDSCH, wherein the DCI does not comprise a first indication field, or a quantity of bits of the first indication field is 0, wherein the first indication field is used to indicate whether to transmit an uplink signal on an uplink (UL) or an SUL.

* * * * *